(12) United States Patent
Hosokawa et al.

(10) Patent No.: US 10,474,698 B2
(45) Date of Patent: Nov. 12, 2019

(54) SYSTEM, METHOD, AND PROGRAM FOR PERFORMING AGGREGATION PROCESS FOR EACH PIECE OF RECEIVED DATA

(71) Applicant: International Business Machines Corporation, Armonk, NY (US)

(72) Inventors: Kaoru Hosokawa, Tokyo (JP); Taku Sasaki, Tokyo (JP); Noriaki Umayahara, Tokyo (JP); Gaku Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 14/472,324

(22) Filed: Aug. 28, 2014

(65) Prior Publication Data
US 2015/0120739 A1    Apr. 30, 2015

(30) Foreign Application Priority Data

Oct. 31, 2013 (JP) ................. 2013-227726

(51) Int. Cl.
*G06F 16/28* (2019.01)
*G06F 16/22* (2019.01)

(52) U.S. Cl.
CPC ............ *G06F 16/285* (2019.01); *G06F 16/22* (2019.01)

(58) Field of Classification Search
CPC ................................................ G06F 17/30598
See application file for complete search history.

(56) References Cited

U.S. PATENT DOCUMENTS 5,546,557 A     8/1996   Allen et al.
2007/0226188 A1*   9/2007   Johnson ............ G06F 17/30516
                                                        707/3
(Continued)

FOREIGN PATENT DOCUMENTS

JP    2000057092 A   2/2000
JP    2001184307 A   7/2001
(Continued)

OTHER PUBLICATIONS

Rahat et al., "Relational Database Management System Material", Feb. 2013.*
(Continued)

*Primary Examiner* — Dawaune A Conyers
(74) *Attorney, Agent, or Firm* — Kelsey M. Skodje

(57) ABSTRACT

An aggregation processing system includes a data transmission unit for transforming data which is a target of an aggregation process into a format of a tuple having a key and for transmitting the tuple to a data processing unit, and the data processing unit for performing an aggregation process of a tuple which has been transmitted. When a tuple transmitted from the data transmission unit is received, the data processing unit invokes an operator and performs an aggregation process. In the aggregation process, aggregated data is generated based on the tuple received by the data processing unit and a related input table, and writing to an output table or generation of an output tuple is performed based on the generated aggregated data. A plurality of aggregation processes are implemented by combining processes by the operators, and the plurality of aggregation processes are performed as one transaction.

13 Claims, 17 Drawing Sheets

(a)

TUPLE NAME : PACKET_INFO

| COLUMN NAME | TYPE | KEY | TUPLE FUNCTION |
|---|---|---|---|
| USERID | STRING | Yes | NONE |
| SEQID | INT | NO | seqid() |
| PACKETNUM | INT | NO | NONE |
| TIME | TIMESTAMP | NO | currenttime() |

(b)

TUPLE NAME : PACKET_INFO_2

| COLUMN NAME | TYPE | KEY | TUPLE FUNCTION |
|---|---|---|---|
| USERID | STRING | Yes | NONE |
| SEQID | INT | NO | NONE |
| PACKETNUM | INT | NO | NONE |
| TIME | TIMESTAMP | NO | NONE |

(56) References Cited

U.S. PATENT DOCUMENTS

| | | | |
|---|---|---|---|
| 2008/0271041 A1 | 10/2008 | Sakai | |
| 2009/0112853 A1 | 4/2009 | Nishizawa et al. | |
| 2010/0131568 A1* | 5/2010 | Weinberg | G06F 17/30607 707/803 |
| 2010/0185847 A1* | 7/2010 | Shasha | G06F 11/1004 713/150 |
| 2012/0066184 A1 | 3/2012 | Barsness et al. | |

FOREIGN PATENT DOCUMENTS

| | | | |
|---|---|---|---|
| JP | 2003162772 A | 6/2003 |
| JP | 2004280371 A | 10/2004 |
| JP | 2005011109 A | 1/2005 |
| JP | 2007026373 A | 2/2007 |
| JP | 2010272022 A | 12/2010 |
| JP | 2011070242 A | 4/2011 |
| JP | 2011237944 A | 11/2011 |
| JP | 2012118928 A | 6/2012 |
| JP | 5377897 B2 | 12/2013 |

OTHER PUBLICATIONS

Ballard et al., "IBM InfoSphere Streams: Harnessing Data in Motion," IBM Redbooks, SG24-7865-00, Sep. 2010, First Edition, 360 pages, IBM Corp.

Onodera et al., "IBM InfoSphere™ Streams," ProVISION, No. 65, Spring 2010, pp. 39-44. (English Abstract).

\* cited by examiner (a)

TUPLE NAME : PACKET_INFO

| COLUMN NAME | TYPE | KEY | TUPLE FUNCTION |
|---|---|---|---|
| USERID | STRING | Yes | NONE |
| SEQID | INT | NO | seqid() |
| PACKETNUM | INT | NO | NONE |
| TIME | TIMESTAMP | NO | currenttime() |

(b)

TUPLE NAME : PACKET_INFO_2

| COLUMN NAME | TYPE | KEY | TUPLE FUNCTION |
|---|---|---|---|
| USERID | STRING | Yes | NONE |
| SEQID | INT | NO | NONE |
| PACKETNUM | INT | NO | NONE |
| TIME | TIMESTAMP | NO | NONE |

FIG. 5

TABLE NAME : PACKET_INFO

| COLUMN NAME | COLUMN TYPE | KEY |
|---|---|---|
| USERID | STRING | Yes |
| SEQID | INT | Yes |
| PACKETNUM | INT | NO |
| TIME | TIMESTAMP | NO |

OPERATOR NAME : te_copy

| DEFINED NAME | DEFINED VALUE |
|---|---|
| OPERATOR NAME | te_copy |
| PARAMETER | NONE |
| INPUT TUPLE NAME | PACKET_INFO |
| OUTPUT TUPLE NAME | PACKET_INFO_2 |
| INPUT TABLE NAME | NONE |
| OUTPUT TABLE NAME | PACKET_INFO |

(b)

OPERATOR NAME ee_avg

| DEFINED NAME | DEFINED VALUE |
|---|---|
| OPERATOR NAME | ee_avg |
| PARAMETER | AGGREGATION TYPE, TIME COLUMN NAME, COLUMN NAME FOR WHICH AVERAGE VALUE IS TO BE CALCULATED |
| INPUT TUPLE NAME | PACKET_INFO_2 |
| OUTPUT TUPLE NAME | NONE |
| INPUT TABLE NAME | PACKET_INFO |
| OUTPUT TABLE NAME | PACKET_INFO_AVG |

INPUT TUPLE/INPUT TABLE MAPPING INFORMATION

| INPUT TUPLE COLUMN NAME | INPUT TABLE COLUMN NAME |
|---|---|
| USERID | USERID |
| SEQID | SEQID |
| PACKETNUM | PACKETNUM |
| TIME | TIME |

FIG. 7

```xml
<?xml version="1.0"?>
<aggregatordef version="1.0">
  <aggregators>
    <aggregator>
      <entities>
        <entity name="DEVICE">
         <columns>
          <column name="DEVICE_ID" type="VARCHAR(64)"/>
          <column name="SEQID" type="BIGINT"/>
          <column name="DEVICE_INFO" type="DEVICE_INFO"/>
         </columns>
         <primarykeys>
          <primarykey name="DEVICE_ID"/>
         </primarykeys>
        </entity>
        <entity name="DEVICE_INFO">
         <columns>
          <column name="DEVICE_ID" type="VARCHAR(64)"/>
          <column name="SEQID" type="BIGINT"/>
          <column name="ON_BOARD_ID" type="VARCHAR(64)"/>
          <column name="OEM_NAME" type="VARCHAR(64)"/>
          <column name="OEM_MODEL" type="VARCHAR(64)"/>
          <column name="OEM_PROTOCOL" type="VARCHAR(64)"/>
          <column name="OWNER_ID" type="VARCHAR(64)"/>
          <column name="OWNER_NAME" type="VARCHAR(64)"/>
          <column name="CONTRACT_ID" type="VARCHAR(64)"/>
          <column name="LAST_MODIFIED" type="TIMESTAMP"/>
         </columns>
         <primarykeys>
          <primarykey name="DEVICE_ID"/>
          <primarykey name="SEQID"/>
         </primarykeys>
         <relations>
          <relation from="DEVICE_ID" to="DEVICE_ID"/>
         </relations>
        </entity>
       </entities>
       <tuples>
         <tuple name="DEVICE_INFO">
          <columns useentity="DEVICE_INFO"/>
         <tuplefunctions>
          <tuplefunction column="SEQID" function="seqid(SEQID)"/>
          <tuplefunction column="LAST_MODIFIED"
            function="currenttime()"/>
         </tuplefunctions>
        </tuple>
       </tuples>
       <operators>
         <operator function="te_copy()" intuple="DEVICE_INFO"
           targetentity="DEVICE_INFO"/>
       </operators>
     </aggregator>
   </aggregators>
</aggregatordef>
```

FIG. 10

SYSTEM, METHOD, AND PROGRAM FOR PERFORMING AGGREGATION PROCESS FOR EACH PIECE OF RECEIVED DATA

BACKGROUND

The present invention relates to a system, a method, and a program for performing an aggregation process for each piece of received data.

Conventionally, as a method of processing a large number of incoming or arriving events or data, there is a method of temporarily accumulating events or pieces of data that are received, and collectively performing a process thereon by batch processing in units of days, weeks, months, or the like. On the other hand, there is an increasing need for a method of instantly processing arriving data. For example, there is known a technique called CEP (Complex Event Processing) according to which processing content or an analysis scenario of data is set in advance, and when arriving data matches a condition, a preset action is instantly executed (for example, see Japanese Patent Application JP2012118928A, "Event Processing Apparatus, Event Processing Method, and Event Processing Program"). There is also a technique called ETL (Extract Transform Loading) of performing a process of collectively transforming pieces of data in a database and saving the same in another database (for example, see Japanese Patent Application JP2005011109A, "Job Management Method, Information Processor, Program, and Recording Medium").

SUMMARY

As a method of processing arriving data, there is an aggregation process of performing a process after combining the data with data that is held, and saving the result. As a technique for instantly performing this aggregation process on arriving data, there is an application combining a conventional data base management system (DBMS), middleware for stream processing for instantly processing data, and the like. However, an aggregation process for a large amount of data involves an extremely large number of data access processes, and the application as mentioned above cannot be easily made to handle an aggregation process for a large amount of data, and development is extremely costly.

The present invention has its object to provide a system for easily implementing an aggregation process of performing, for each piece of arriving data, a process on arriving data after combining the same with data that is already held, and saving the result.

With respect to such an object, the present invention provides a system for receiving data having a key that is a value used for classification from outside, and performing an aggregation process for each piece of received data, the system including a reception unit for receiving first data having the key as a target of the aggregation process, a holding unit for holding a database, and a storage unit for storing second data in the database held by the holding unit, the second data having the key and generated in a process by at least one operator, the process being performed on the first data received by the reception unit, the at least one operator being a processing unit for performing the aggregation process.

Here, the operator that is invoked by the storage unit may receive, in addition to the first data, third data that is read from the database, and perform a process on the first data based on the first data and the third data.

Furthermore, the present invention also provides a system for receiving data having a key that is a value used for classification from outside, and performing an aggregation process for each piece of received data, the system including a holding unit for holding a database, and a plurality of processing units for receiving specific data having the key as first input data, performing a predetermined process on the first input data, and outputting at least one of first output data and second output data based on a processing result, the first output data having the key, the second output data, having the key, to be stored in the database that is held by the holding unit, wherein, of the plurality of processing units, a processing unit that takes the data received from outside as the first input data is a first processing unit, and a processing unit that receives the first output data output by another processing unit as the first input data follows the other processing unit.

Here, the processing unit may receive, in addition to the first input data, data that is read from the database as second input data, and perform the predetermined process based on the first input data and the second input data.

Also, in a case where no first output data is output from the plurality of processing units, or the other processing unit that takes the first output data that is output as the first input data is not present, the aggregation process for the data having the key may be ended.

Moreover, the present invention also provides a system for receiving data having a key that is a value used for classification from outside, and performing an aggregation process for each piece of received data, the system including a reception unit for receiving first input data having the key as a target of the aggregation process, a holding unit for holding a database, a processing unit for invoking at least one operator that is means for performing the aggregation process depending on the first input data received by the reception unit, performing a predetermined process on the first input data by the at least one operator invoked, and outputting, in the process by each operator, at least one of first output data and second output data, the first output data having the key, the second output data having the key and to be stored in the database held by the holding unit, and a storage unit for storing the first output data output by the processing unit, wherein, when receiving the first input data, if there is the first output data stored in the storage unit, the reception unit receives the first output data as the first input data, and if there is no first output data stored in the storage unit, the reception unit receives the data received from outside as the first input data.

Here, after the predetermined process by the processing unit is ended, if there is no first output data stored in the storage unit, content of the database where the second output data is stored may be fixed.

Also, the content of the database may be fixed every time the process of the operator by the processing unit is ended.

Moreover, the present invention also provides a method for receiving data having a key that is a value used for classification from outside, and performing an aggregation process for each piece of received data, the method including receiving first data having the key as a target of the aggregation process, and performing, by at least one operator that is a processing unit for performing the aggregation process, a process on the first data received, and storing second data in a database stored in a storage unit, the second data having the key and generated in the process by the at least one operator.

Still further, the present invention also provides a program for causing a computer to receive data having a key that is a value used for classification from outside, and performing an aggregation process for each piece of received data, the program causing the computer to implement a function of receiving first data having the key as a target of the aggregation process, and a function of performing, by at least one operator that is a processing unit for performing the aggregation process, a process on the first data received, and storing second data in a database stored in a storage unit, the second data having the key and generated in the process by the at least one operator.

According to the present invention, there may be provided a system for easily implementing an aggregation process of performing, for each piece of arriving data, a process on arriving data after combining the same with data that is already held, and saving the result.

BRIEF DESCRIPTION OF THE SEVERAL VIEWS OF THE DRAWINGS

FIGS. 5(a) and 5(b) are diagrams showing examples of tuple definition information according to the embodiment;

FIG. 6 is a diagram showing an example of table definition information according to the embodiment;

FIGS. 7(a) and 7(b) are diagrams showing examples of operator definition information according to the embodiment;

FIG. 10 is a diagram showing an example of a description of definition information according to the embodiment;

FIG. 12-1 is a diagram for describing a first example of an optimization process according to the embodiment;

FIG. 12-2 is a diagram for describing the first example of the optimization process according to the embodiment;

DETAILED DESCRIPTION

Figure 1:
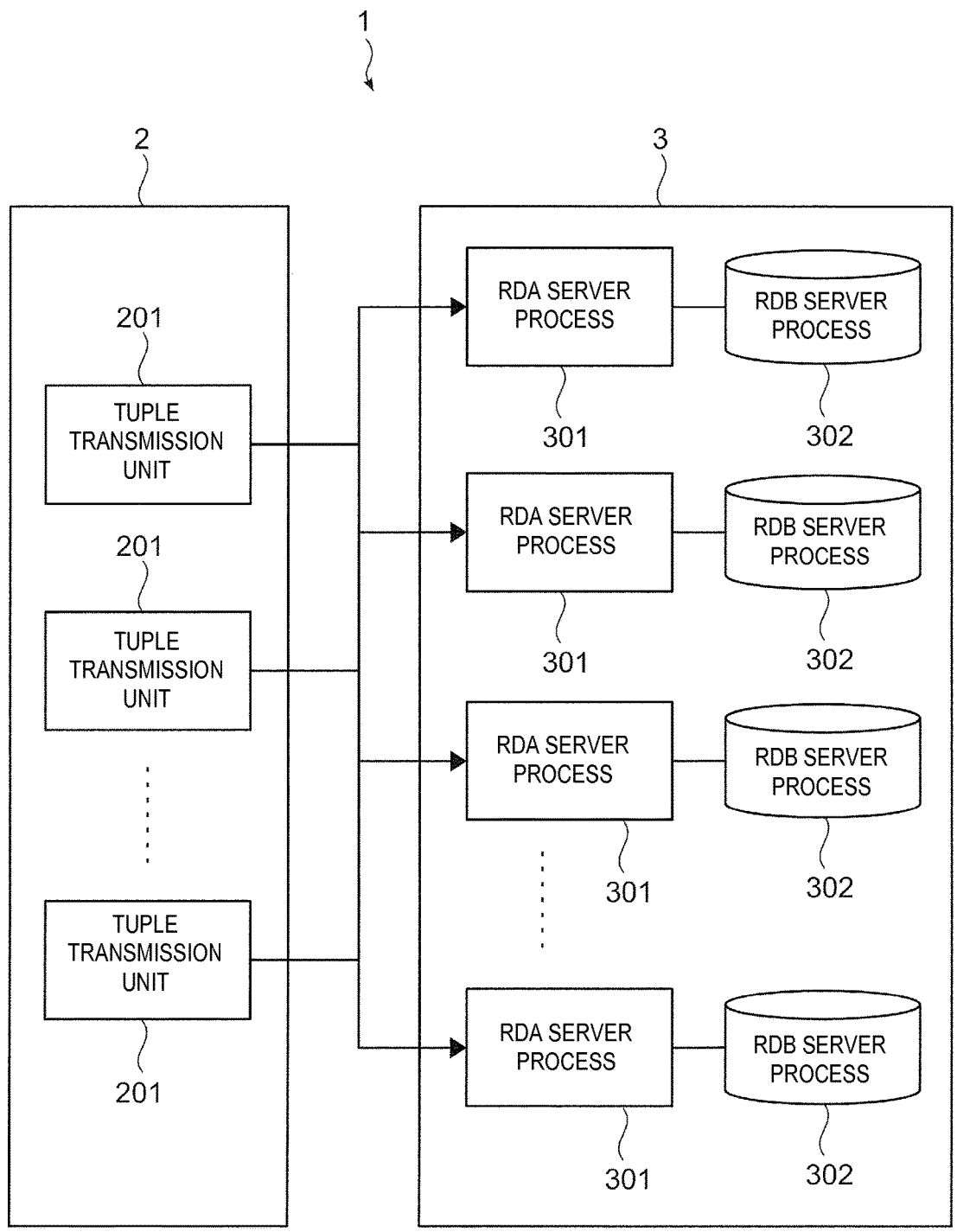
FIG. 1 is a diagram showing an example of a schematic configuration of an aggregation processing system according to an embodiment of the present invention.

FIG. 1 is a diagram showing an example of a schematic configuration of an aggregation processing system 1 according to the embodiment of the present invention. The aggregation processing system 1 is a system that performs an aggregation process every time a piece of data arrives when a large number of pieces of data are arriving from the outside of the system one after the other, without performing the process in a collective manner after accumulating the pieces of data. In the embodiment, the aggregation process refers to a process of performing arithmetic processing on arriving data after combining the data with data that is already held, saving the result, and updating a database.

The aggregation process according to the embodiment is performed based on the following rules. When data arrives from outside to the aggregation processing system 1, the data which has arrived is transformed into a tuple format. A tuple is each piece of data to be stored in a database, and a tuple includes at least one column having a specific name and a type. Also, at least one column, as a key, is defined for a tuple (hereinafter, a column as a key is referred to as a key column). Each tuple is classified according to a value entered into this key column (hereinafter, a value entered in a key column is referred to as a key value).

Then, the aggregation processing system 1 treats a plurality of tuples with the same key value as a series of data, and processes the same in the order of arrival. However, pieces of data with different key values may not be processed in the order of arrival. Also, overall, the aggregation processing system 1 receives a large number of pieces of data in parallel, but pieces of data with the same key value are assumed to not arrive simultaneously in parallel.

Furthermore, the aggregation processing system 1 performs one or more aggregation processes for each piece of arriving data. These aggregation processes are executed as a transaction. A transaction is a plurality of related processes put together as one unit of processing, and the process is ended by being committed or aborted. The state of "being committed" is a state where processing of a transaction has succeeded and the processing result is fixed, and the state of "being aborted" is a state where processing of a transaction has failed and the processing result is not reflected.

That is, the aggregation processing system 1 performs, as a transaction, one or more aggregation processes on one piece of arriving data. Then, in the case all the aggregation processes of the transaction have normally ended, the transaction is committed, and the processing result of the aggregation processes is assumed to be fixed and is reflected in the database. On the other hand, in the case at least one aggregation process among the aggregation processes of the transaction is interrupted due to occurrence of a fault, the transaction is aborted and the processing result of aggregation processes which have already been performed is cancelled, and the database is returned to the original state before the execution of the transaction. In this manner, the aggregation processing system 1 performs aggregation processes for each piece of data in parallel with reception of a large number of pieces of data.

Next, structural elements of the aggregation processing system 1 shown in FIG. 1 will be described. The aggregation processing system 1 according to the embodiment includes a data transmission unit 2 for transforming data which is to be the target of aggregation processes of the aggregation processing system 1 into a tuple format and for transmitting the data to a data processing unit 3, and the data processing unit 3 for performing aggregation processes on a tuple which has been transmitted. Also, the data transmission unit 2 includes a plurality of tuple transmission units 201, and the data processing unit 3 includes a plurality of RDA (Realtime Data Aggregation) server processes 301 and RDB (Relational Database) server processes 302. An RDA server process is a server process for implementing an aggregation process (realtime data aggregation: RDA) according to the embodiment. An RDB server process is a server process for managing data in a table format having rows and columns. Also, a server process is processing means to be performed by a server device for a certain purpose.

At the data transmission unit 2, each tuple transmission unit 201 executes a tuple transmission program to transform data which is the target of an aggregation process into a tuple format, and transmits the transformed tuple to the RDA server process 301 of the data processing unit 3. The tuple transmission unit 201 transforms, into a tuple, data received from a device, outside the aggregation processing system 1, having data which is to be the target of an aggregation process. Also, each tuple transmission unit 201 is interconnected to an RDA server process 301. At the time of transmission of a tuple, the tuple transmission unit 201 obtains, based on the key value of the tuple, an identifier for identifying the RDA server process 301, and transmits the tuple to the RDA server process 301 identified by the obtained identifier. As a method of obtaining the identifier, there is a method of calculating a hash value from the key value of the tuple, and calculating the identifier by residue calculation based on the number of the RDA server processes 301, for example. Also, the plurality of tuple transmission units 201 may be implemented by separate servers, PCs (Personal Computers), or the like, or by one server or the like.

The data processing unit 3 performs an aggregation process on the tuple which has been transmitted from the data transmission unit 2. Data that is referred to during the procedure of this aggregation process is stored in the RDB server process 302 connected to the RDA server process 301, but it is also held in a memory in the RDA server process 301 for the purpose of increasing the speed. Then, at the time of update of data in the database during the procedure of the aggregation process, the data is written to the RDB server process 302, and in the case the data is held in the memory in the RDA server process 301, the value is also updated. Details of the aggregation process to be performed by the data processing unit 3 will be given below.

Furthermore, the data processing unit 3 is implemented by a server or the like for implementing processing of the aggregation process. Additionally, each server process may be arranged at an arbitrary server or the like connected through a network. That is, a plurality of server processes may be arranged at one server or the like, or a plurality of server processes may be arranged at different servers or the like. Furthermore, for example, a configuration is also possible where such a server is made to execute the tuple transmission program of the data transmission unit 2, and where the functions of the data transmission unit 2 and the data processing unit 3 are implemented by the same server or the like.

Figure 2:
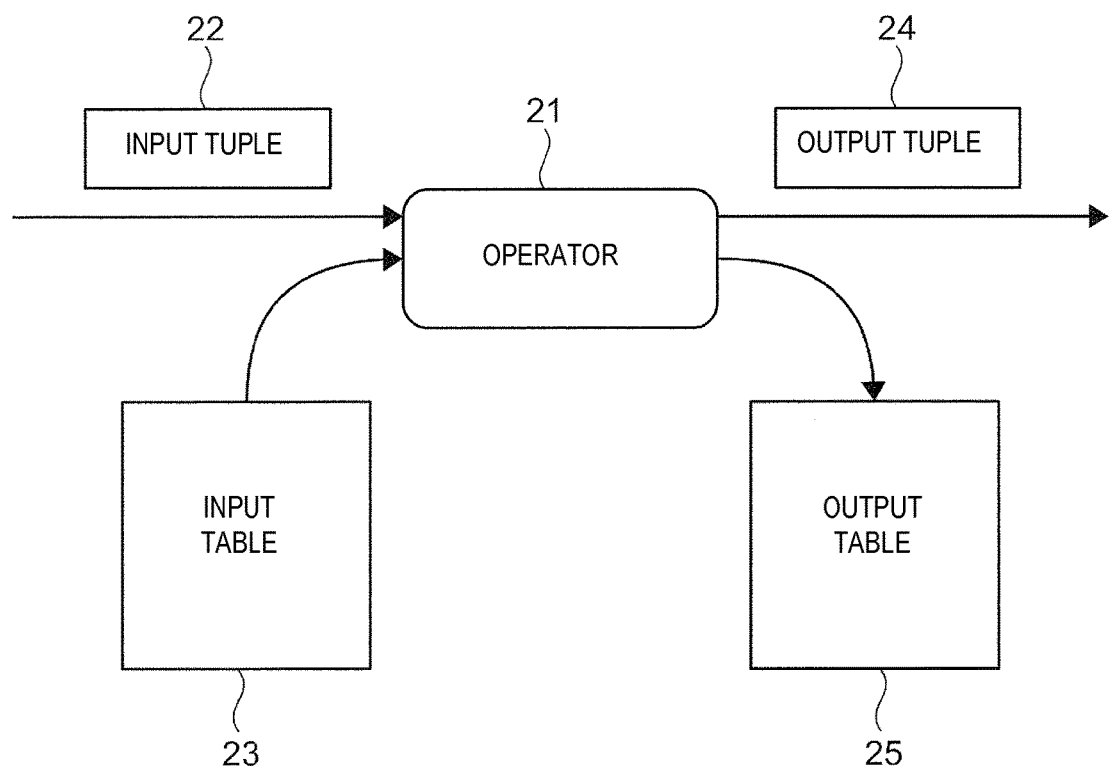
FIG. 2 is a diagram for describing an example of a basic model according to the embodiment.

Next, a basic model as the base of the aggregation process to be performed by the data processing unit 3 will be described. FIG. 2 is a diagram for describing an example of a basic model according to the embodiment. According to the basic model, there is one object (hereinafter, referred to as an operator) that performs the aggregation process on a tuple.

Now, pieces of information about a tuple that is taken by the operator as a processing target (hereinafter, referred to as an input tuple), a table to be processed in combination with the input tuple (hereinafter, referred to as an input table), a table in which the processing result of the operator is written (hereinafter, referred to as an output table), and a tuple that is output by the processing by the operator (hereinafter, referred to as an output tuple) are defined for the operator. According to the basic model shown in FIG. 2, pieces of information about an input tuple 22, an input table 23, an output tuple 24, and an output table 25 are assumed to be defined for an operator 21. Moreover, the operator 21 is a concrete element for implementing the RDA server process 301 of the data processing unit 3, and the input table 23 and the output table 25 are concrete elements for implementing the RDB server process 302 of the data processing unit 3. In the embodiment, the operator is provided as an example of a processing unit for performing a predetermined process on first input data.

For example, when the data processing unit 3 receives a tuple (input tuple 22) which has been transmitted from the data transmission unit 2, the operator 21 which defines this tuple (input tuple 22) as an input tuple is invoked, and the process by the invoked operator 21 is performed. In the process by the operator 21, aggregated data is generated based on the input tuple 22 and a record group in the input table 23 related to the key column (key value) of the input tuple 22. The record here is pieces of data for one case in the table. Then, the content of the aggregated data which has been generated is written to the output table 25, and also, the output tuple 24 is generated.

The content to be written to the output table 25 is assumed to include at least the key value of the input tuple 22. Also, since the output tuple 24 is data that is generated based on the input tuple 22, the output tuple 24 is assumed to include the key value of the input tuple 22. The output tuple 24 may be the input tuple for the next operator to perform a process, or it may be output to outside the data processing unit 3 and be processed by a system different from the aggregation processing system 1.

As described above, as the aggregation process, the operator 21 generates aggregated data based on the input tuple 22 and the input table 23, and updates the output table 25 or generates the output tuple 24. Moreover, if a plurality of such basic models are combined, a plurality of aggregation processes will be performed as a series of processes. Note, however, that the basic model is not restricted to the configuration shown in FIG. 2. The input tuple is an item which has to be defined for each operator, but the input table, the output table, and the output tuple may not have to be defined depending on the content of the process by the operator. For example, in the case the input table is not defined, the operator generates the aggregated data based on the information of the input tuple. Moreover, a plurality of input tables and output tables may be defined for one operator.

Figure 3:
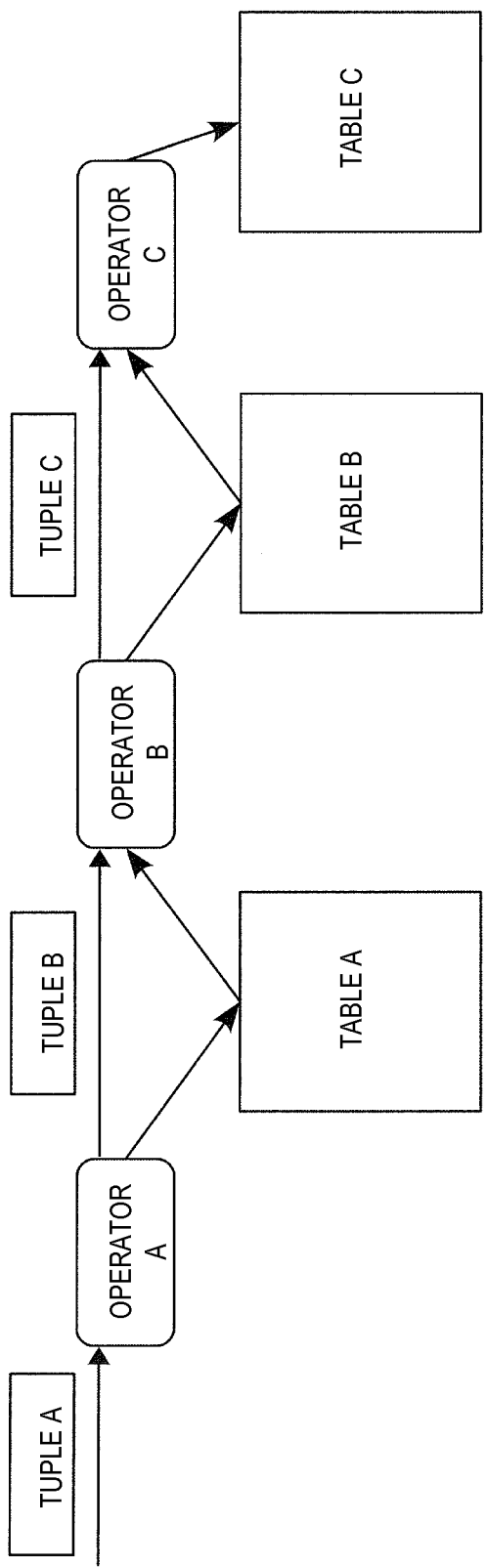
FIG. 3 is a diagram for describing an example of a configuration where basic models according to the embodiment are combined.

Next, a process that is performed according to a configuration where a plurality of basic models shown in FIG. 2 are combined will be described. FIG. 3 is a diagram for describing an example of a configuration where the basic models according to the embodiment are combined. In the configuration shown in FIG. 3, there are three operators (operator A, operator B, operator C), and the aggregation processes by respective operators are performed as one transaction. Also, in the illustrated example, the input table is not defined for the operator A, and the output tuple is not generated by the process by the operator C.

First, when a tuple A transmitted from the data transmission unit 2 arrives at the data processing unit 3, the operator A (corresponding to the tuple A) that defines the tuple A as an input tuple is invoked. In the process by the operator A, a record is written to a table A, which is defined as the output table of the operator A, based on the tuple A as the input tuple, and a tuple B is generated as the output tuple.

Next, the operator B is invoked as the operator corresponding to the tuple B. In the process by the operator B, a record is written to a table B as the output table based on the tuple B as the input tuple of the operator B and the table A as the input table, and a tuple C is generated as the output tuple.

Next, the operator C is invoked as the operator corresponding to the tuple C. In the process by the operator C, a record is written to a table C as the output table based on the tuple C as the input tuple of the operator C and the table B as the input table. Since an output tuple is not generated in the process by the operator C, the series of processes shown in FIG. 3 ends here.

In this manner, the aggregation processes by the respective operators are performed, as a transaction, on the tuple A which has arrived from the data transmission unit 2. Also, the key value of the tuple A is assumed to be included in the records that are written to the output tables (tables A to C) of the operators. Moreover, the key value of the tuple A is also included in the output tuples (tuples B and C) of the operators. Additionally, the example shown in FIG. 3 describes a case where the tuple A has arrived, but in reality, a large number of tuples other than the tuple A arrive at the data processing unit 3, and transactions for tuples with different key values are performed as separate processes.

Also, in the configuration shown in FIG. 3, an example where processes by three operators are performed as a transaction is shown, but there is no restriction on the number of operators, and a process by one operator may be performed as a transaction, for example.

Furthermore, in the configuration shown in FIG. 3, an example is shown where the output table of the operator A and the input table of the operator B are the same table A, and the output table of the operator B and the input table of the operator C are the same table B, but this configuration is not restrictive. For example, the output table of an operator and the input table of the next operator to perform a process may be different tables, such as the input table of the operator B being the table B in the case where the output table of the operator A is the table A.

Figure 4:
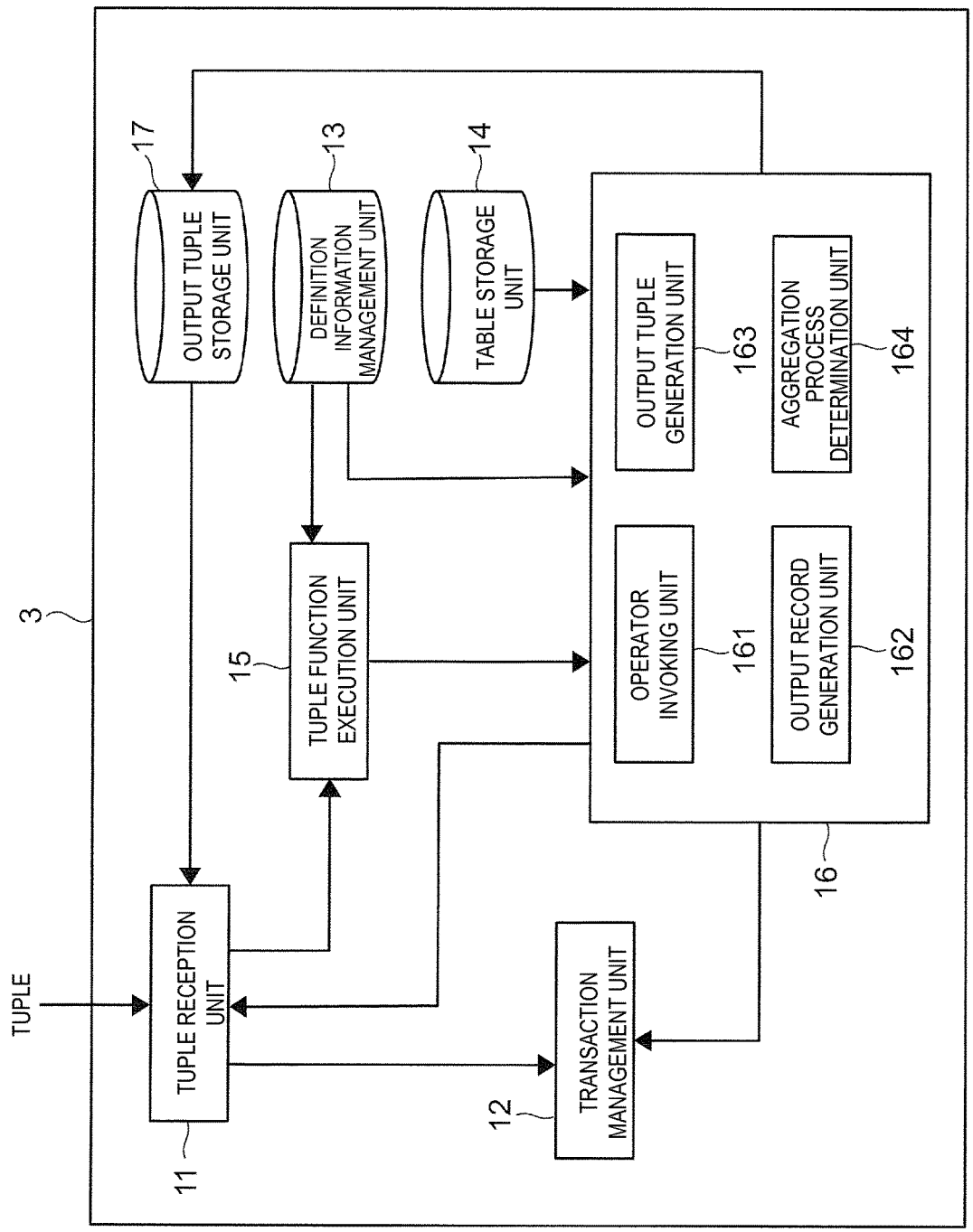
FIG. 4 is a block diagram showing an example functional configuration of a data processing unit according to the embodiment.

Next, the functional configuration of the data processing unit 3 that performs the aggregation process according to the embodiment will be described. FIG. 4 is a block diagram showing an example functional configuration of the data processing unit 3 according to the embodiment.

The data processing unit 3 includes a tuple reception unit 11 for receiving a tuple to be the target of an aggregation process, a transaction management unit 12 for starting or completing a transaction, and a definition information management unit 13 for storing information defined for a tuple, a table or an operator. The data processing unit 3 also includes a table storage unit 14 for storing a table that is to be used in an aggregation process, a tuple function execution unit 15 for executing a function set in advance for each column of a tuple (hereinafter, referred to as a tuple function), an aggregation process execution unit 16 for performing an aggregation process on a tuple, and an output tuple storage unit 17 for storing a tuple output by an aggregation process.

The tuple reception unit 11 as an example of a reception unit receives a tuple transmitted from the data transmission unit 2. The tuple reception unit 11 also receives, after an aggregation process is performed on the tuple, a tuple that is stored in the output tuple storage unit 17 as a tuple on which the aggregation process is to be performed next. Here, the tuple reception unit 11 determines whether or not the output tuple storage unit 17 is empty, and receives the tuple stored in the output tuple storage unit 17 in the case the output tuple storage unit 17 is not empty. On the other hand, in the case the output tuple storage unit 17 is empty, the tuple reception unit 11 notifies the transaction management unit 12 that the output tuple storage unit 17 is empty. In the embodiment, the tuple that is transmitted from the data transmission unit 2 is used as an example of first data.

The tuple stored in the output tuple storage unit 17 has the same key value as the tuple that is transmitted from the data transmission unit 2. If another tuple having the same key value is transmitted from the data transmission unit 2 while the tuple is stored in the output tuple storage unit 17, the tuple reception unit 11 does not receive the tuple from the data transmission unit 2. This is because, if a tuple having the same key value is newly received and a transaction is started, the database that is being updated by the transaction under way may be partially further updated, resulting in inconsistency in the database.

As described, with respect to tuples having the same key value, the tuple reception unit 11 does not receive a tuple from the data transmission unit 2 with respect to the key value until there is no more tuple in the output tuple storage unit 17, the transaction is completed and the updated content of the database is fixed. According to this configuration, inconsistency in the database is prevented. Also, to maintain consistency of data, from the start to the completion (or interruption) of a transaction, the input table and the output table used in the process of the transaction are controlled to be not used in the process of another transaction.

Also, when a tuple input from the data transmission unit 2 or a tuple stored in the output tuple storage unit 17 is received, the tuple reception unit 11 notifies the transaction management unit 12 of the reception of the tuple, and also, transmits the received tuple to the tuple function execution unit 15.

The transaction management unit 12 starts or completes a transaction with respect to a process by at least one operator. Here, when a notification regarding reception of a tuple is received from the tuple reception unit 11, the transaction management unit 12 determines whether or not a transaction is already started. In the case a transaction is not yet started, the transaction management unit 12 starts a transaction.

Also, when a notification that the output tuple storage unit 17 is empty is received from the tuple reception unit 11, the transaction management unit 12 completes (commits) the transaction. Moreover, in the case an aggregation process fails, the transaction management unit 12 interrupts (aborts) the transaction.

The definition information management unit 13 stores definition information defined for a tuple, a table or an operator. Information defined for a tuple (hereinafter, referred to as tuple definition information) is information about a tuple as an input tuple or an output tuple. Specifically, the tuple definition information is set for each tuple name of a tuple, and includes information about the name of each column of the tuple, the type of each column, the column name of a key column of the tuple, and a tuple function set in advance for each column. As a tuple function, there is a function for recording a current time in the column of a timestamp, for example. Details of the tuple definition information will be given with reference to FIG. 5.

Also, information defined for a table (hereinafter, referred to as table definition information) is information about a table that is used as an input table or an output table in an aggregation process. Specifically, the table definition information is set for each table, and includes information about the name of a table, the name of each column of the table, the type of each column, and the column name of a key column of the table. Details of the table definition information will be given with reference to FIG. 6.

Furthermore, information defined for an operator (hereinafter, referred to as operator definition information) is information about an operator that is invoked by an operator invoking unit 161. Specifically, the operator definition information is set for each operator, and includes an operator name, a parameter used in the process by the operator, the tuple name of an input tuple, the tuple name of an output tuple, the table name of an input table, and the table name of an output table.

Moreover, the operator definition information includes input tuple/input table mapping information. This input tuple/input table mapping information is information used for acquiring a record corresponding to the column of an input tuple from an input table, and is correspondence information of the column name of an input tuple and the column name of an input table, for example. Furthermore, information such as information about the value of which column of an input tuple, an input table, or an output table is to be set for an output tuple at the time of generation of an output tuple is sometimes defined in the operator definition information. Details of the operator definition information will be given with reference to FIG. 7.

The table storage unit 14 stores data of a table that is used as an input table or an output table in an aggregation process. In the embodiment, the table storage unit 14 is provided as an example of a holding unit, or a storage unit for storing a database.

The tuple function execution unit 15 executes a tuple function defined for each column of a tuple, based on the tuple name of a tuple transmitted from the tuple reception unit 11 and the tuple definition information stored in the definition information management unit 13. Here, the tuple function execution unit 15 determines, based on the tuple name of the tuple transmitted from the tuple reception unit 11 and the tuple definition information corresponding to the tuple name, whether or not there is a tuple function defined for the tuple. In the case there is a defined tuple function, the tuple function execution unit 15 invokes the defined tuple function, performs the process of the invoked tuple function, and changes the value in the column of the tuple. Then, the tuple function execution unit 15 transmits the tuple the value of whose column has been changed to the aggregation process execution unit 16. In the case there is no defined tuple function, the tuple function execution unit 15 transmits, as it is, the tuple which has been transmitted from the tuple reception unit 11 to the aggregation process execution unit 16.

Next, the aggregation process execution unit 16 will be described. The aggregation process execution unit 16 includes the operator invoking unit 161 for invoking an operator and performing a process, an output record generation unit 162 for generating a record of an output table, an output tuple generation unit 163 for generating an output tuple, and an aggregation process determination unit 164 for determining whether or not an aggregation process has succeeded, and performs an aggregation process on a tuple that is transmitted from the tuple function execution unit 15. Moreover, in the embodiment, the aggregation process execution unit 16 is provided as an example of a storage unit, or a processing unit for performing a predetermined process by at least one operator.

The operator invoking unit 161 invokes an operator corresponding to a tuple transmitted from the tuple function execution unit 15, and performs a process by the operator. Here, the operator invoking unit 161 determines, based on the tuple name of the tuple transmitted from the tuple function execution unit 15 and the operator definition information stored in the definition information management unit 13, whether or not there is an operator that is not yet executed among operators for which the tuple is defined as the input tuple. In the case there is an operator that is not yet executed, the operator invoking unit 161 acquires the operator definition information of the operator that is not yet executed from the definition information management unit 13. Also, in the case there are a plurality of operators that are not yet executed, the operator invoking unit 161 selects one of the operators that are not yet executed, and acquires the definition information of the selected operator. In the embodiment, the input tuple is used as an example of first input data.

Next, the operator invoking unit 161 acquires the record of the input table defined in the acquired operator definition information from the table storage unit 14 (hereinafter, the record of an input table will be referred to as an input record). Then, the operator invoking unit 161 executes the function of the operator (hereinafter, referred to as an operator function) with the value in the column of the input tuple and the input record as arguments, and generates aggregated data. At the time of executing the operator function, the operator invoking unit 161 acquires the record corresponding to the column of the input tuple from the input table based on the input tuple/input table mapping information of the operator definition information. In the embodiment, the input record is used as an example of third data, or second input data.

Also, in the case there is no operator corresponding to the tuple transmitted from the tuple function execution unit 15, or in the case all of the processes of respective operators corresponding to the tuple have been performed, the operator invoking unit 161 notifies the tuple reception unit 11 to receive, from the output tuple storage unit 17, a tuple for which the aggregation process is to be performed next.

The output record generation unit 162 acquires, from the definition information management unit 13, the table definition information of the output table defined in the operator definition information. Then, the aggregated data generated by the operator invoking unit 161 is transformed into the format of a record of the output table (hereinafter, the record of an output table will be referred to as an output record), and the output record obtained by the transformation is written to the output table stored in the table storage unit 14. The output record that is to be written at this time is assumed to include the same key value as the tuple which has been transmitted from the data transmission unit 2. In the embodiment, the output record is used as an example of second data, or second output data.

The output tuple generation unit 163 generates an output tuple based on the input tuple, the input record, and the output record. Here, the output tuple generation unit 163 acquires, from the definition information management unit 13, the tuple definition information corresponding to the tuple name of the output tuple defined in the operator definition information. Then, the output tuple generation unit 163 sets the values in the columns of the input tuple, the input record, and the output record according to the tuple definition information of the output tuple, and generates the output tuple. The output tuple generated here is assumed to include the same key value as the tuple which has been transmitted from the data transmission unit 2. In the embodiment, the output tuple is used as an example of first output data.

Here, at the time of generating the output tuple, if, for example, information as to the value in the column of which of the input tuple, the input table, and the output table is to be set to the output tuple is defined in the operator definition information, the output tuple generation unit 163 generates the output tuple based on this information. If such information is not defined, the output tuple generation unit 163 generates the output tuple according to a preset rule of the processing system. A preset rule of the processing system is, for example, setting of the value of the column of an input tuple in the column of an output tuple having the same name as the column of the input tuple.

The aggregation process determination unit 164 determines whether or not the aggregation process, that is execution of an operator function by the operator invoking unit 161, writing to the output table by the output record generation unit 162, and generation of an output tuple by the output tuple generation unit 163, has succeeded. In the case the aggregation process has succeeded, the aggregation process determination unit 164 notifies the operator invoking unit 161 to successively perform the process on an operator that is not yet executed. Also, in the case an output tuple was generated in the aggregation process, the aggregation process determination unit 164 stores the generated output tuple in the output tuple storage unit 17. Here, in the case there is no operator defining the generated output tuple as an input tuple, the aggregation process determination unit 164 assumes that the output tuple is data to be processed by a system different from the aggregation processing system 1, for example, and outputs the same to outside the data processing unit 3 without storing the same in the output tuple storage unit 17. On the other hand, in the case the aggregation process has failed, the aggregation process determination unit 164 notifies the transaction management unit 12 that the aggregation process has failed.

In the case an output tuple is generated by the output tuple generation unit 163, the output tuple storage unit 17 stores the generated output tuple. In the embodiment, the output tuple storage unit 17 is provided as an example of a storage unit for storing the first output data.

Next, the tuple definition information stored in the definition information management unit 13 will be described. FIGS. 5(*a*) and 5(*b*) are diagrams showing examples of the tuple definition information according to the embodiment. The tuple definition information shown in FIG. 5(*a*) is the tuple definition information of a tuple name "PACKET_INFO", and the tuple definition information shown in FIG. 5(*b*) is the tuple definition information of a tuple name "PACKET_INFO_2".

The tuple definition information shown in FIG. 5(*a*) shows, with respect to a tuple whose tuple name is "PACKET_INFO", the name of each column, the type of each column, information of the key column, and the tuple function of each column. The tuple has four columns, and the names of the columns are "USERID", "SEQID", "PACKETNUM", and "TIME". Also, the types of the columns "USERID", "SEQID", "PACKETNUM", and "TIME" are STRING, INT, INT, and TIMESTAMP, respectively. Furthermore, since the key section of the column "USERID" is "Yes", it can be grasped that the column of "USERID" is the key column of the tuple. The key sections of other three columns are "No", and thus, only the column of "USERID" is the key column. That is, the tuple of the tuple name "PACKET_INFO" is identified by the value of the column "USERID", and a plurality of tuples whose values of the column "USERID" are the same are processed as a series of data. Also, in the case the data transmission unit 2 transmits this tuple, the data processing unit 3 to be the transmission destination of the tuple is identified based on the value of the column "USERID".

Also, the section of the tuple function of the column "USERID" is "NONE", and no tuple function is defined. On the other hand, the section of the tuple function of the column "SEQID" is "seqid( )", and a tuple function is defined. The tuple function "seqid( )" is a function for acquiring the value of the column "SEQID" in a master table associated with the key value of the tuple, incrementing the acquired value by one, and recording the value in the column "SEQID" of the tuple, and also, updating the value of the column "SEQID" of the master table. That is, the value of the "SEQID" is sequentially incremented by one and is assigned to each of a plurality of tuples whose values of the key column "USERID" are the same. According to this configuration, a number (the number of SEQID) is sequentially assigned to the tuples having the same user ID, and the aggregation process is sequentially performed thereon.

Also, a tuple function "currenttime( )" is defined in the column "TIME". When the tuple function "currenttime( )" is executed, the timestamp of the current time is recorded in the column of the "TIME" of the tuple as the reception time of the tuple. A timestamp is a character string indicating the date and time, date, time or the like of occurrence of an event.

Furthermore, the tuple definition information shown in FIG. 5(*b*) shows, with respect to a tuple whose tuple name is "PACKET_INFO_2", the name of each column, the type of each column, information of the key column, and the tuple function of each column. The tuple has four columns, and the names of the columns are the same as those of the tuple "PACKET_INFO", namely, "USERID", "SEQID", "PACKETNUM", and "TIME". Also, the key column of the tuple is "USERID", and no tuple function is defined for the columns.

Next, the table definition information that is stored in the definition information management unit 13 will be described. FIG. 6 is a diagram showing an example of the table definition information according to the embodiment. The table definition information shown in FIG. 6 is the table definition information of a table name "PACKET_INFO".

The table definition information shown in FIG. 6 shows, with respect to a table whose table name is "PACKET_INFO", the name of each column, the type of each column, and information of the key column. The table has four columns, and the names of the columns are "USERID", "SEQID", "PACKETNUM", and "TIME". Also, the types of the columns "USERID", "SEQID", "PACKETNUM", and "TIME" are STRING, INT, INT, and TIMESTAMP, respectively. Furthermore, since the key sections of the columns "USERID" and "SEQID" are "Yes", it can be grasped that the columns of "USERID" and "SEQID" are the key columns of the table. That is, the record of the table name "PACKET_INFO" is identified by the values of the column "USERID" and the column "SEQID".

Next, the operator definition information that is stored in the definition information management unit 13 will be described. FIGS. 7(*a*) and 7(*b*) are diagrams showing examples of the operator definition information according to the embodiment. The operator definition information shown in FIG. 7(*a*) is the definition information of an operator name "te_copy", and the operator definition information shown in FIG. 7(b) is the definition information of an operator name "ee_avg".

The operator definition information shown in FIG. 7(a) shows, with respect to an operator whose operator name is "te_copy", the operator name, information about the parameter to be used for the execution of the operator function, the input tuple name, the output tuple name, the input table name, and the output table name. This operator "te_copy" is an operator for performing a process of writing a column value of an input tuple to the output table. The section of the parameter to be used for the execution of the operator function is "NONE", and no parameter is defined. Also, the input tuple name is "PACKET_INFO", and the output tuple name is "PACKET_INFO_2". The input table name is "NONE", and the input table is not defined, and the output table name is "PACKET_INFO". Since the input table is not defined, the input tuple/input table mapping information is also not present.

The operator definition information shown in FIG. 7(b) shows, with respect to an operator whose operator name is "ee_avg", the operator name, information about the parameter to be used for the execution of the operator function, the input tuple name, the output tuple name, the input table name, and the output table name. Unlike in the case of the operator "te_copy", a parameter is defined for the operator "ee_avg". The operator "ee_avg" performs, based on this parameter, a process of calculating an average value of records in the time range corresponding to an aggregation type among the record group of the input table, and of writing the calculated average value to the output table. The aggregation type is units of minutes, units of hours, units of days, units of months, or the like. For example, in the case data of the number of packets of a mobile phone consecutively arrives at the aggregation processing system 1, the average value of the number of packets per minute (that is, the aggregation type is units of minutes) is written to the output table by the operator "ee_avg".

Also, a table "PACKET_INFO" is defined for the operator "ee_avg" as the input table, and thus, the input tuple/input table mapping information is present. In the input tuple/input table mapping information, the column name of the input tuple, and the column name of the corresponding input table are indicated. That is, the correspondence between the column name of the input tuple "PACKET_INFO_2" and the column name of the corresponding input table "PACKET_INFO" are indicated, and it can be seen that the columns "USERID", "SEQID", "PACKETNUM", and "TIME" of the input table correspond to the columns "USERID", "SEQID", "PACKETNUM", and "TIME" of the input tuple, respectively. In the example shown in FIG. 7(b), the column names of the column of the input tuple and the corresponding column of the input table are the same, but the column names may differ between the two. Also in this case, which column of the input tuple corresponds to the column of the input table may be grasped based on the input tuple/input table mapping information.

Figure 8:
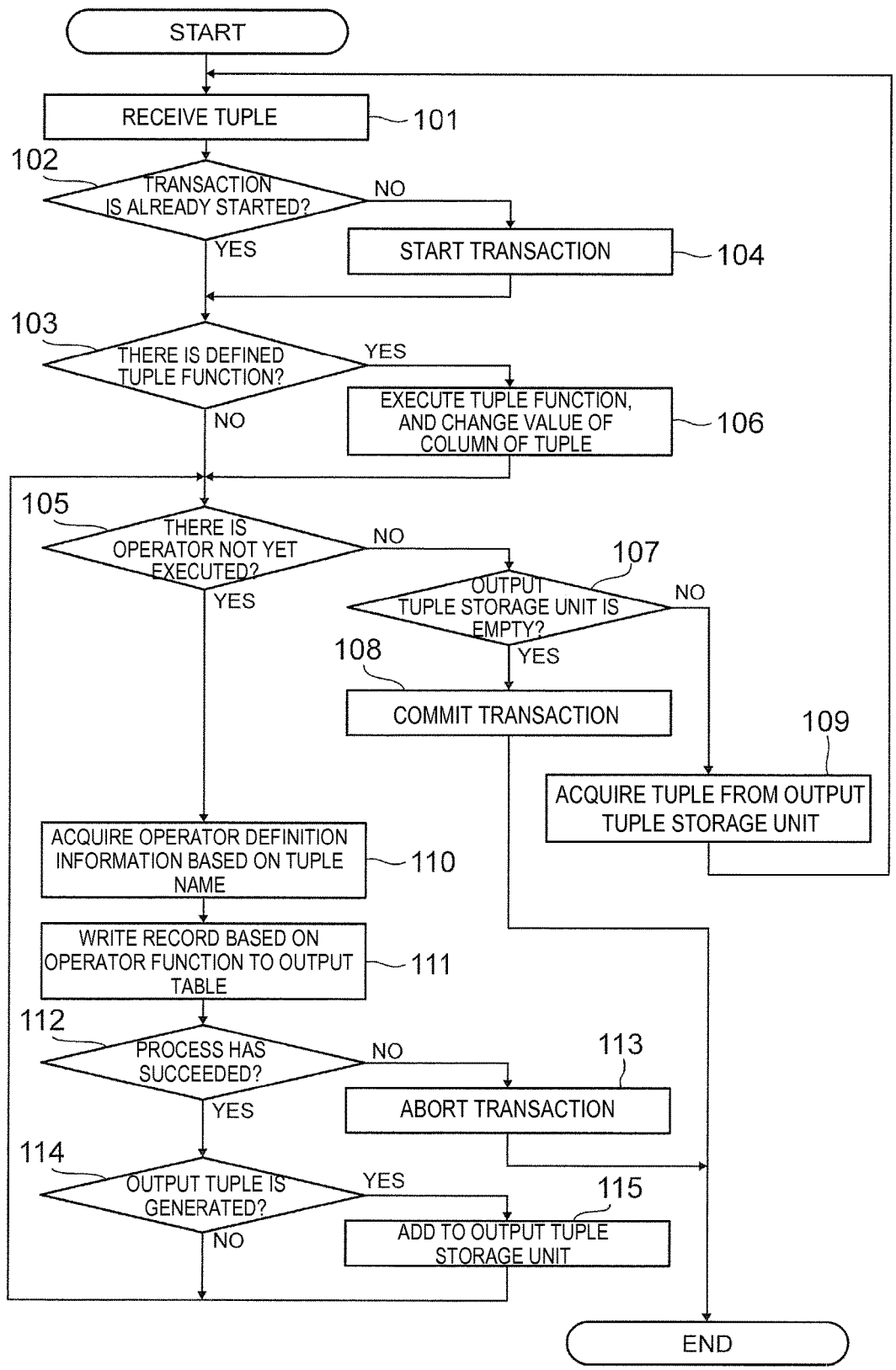
FIG. 8 is a flow chart showing an example of an aggregation processing procedure by the data processing unit according to the embodiment.

Next, the procedure of an aggregation process will be described. FIG. 8 is a flow chart showing an example of an aggregation processing procedure by the data processing unit 3 according to the embodiment.

First, the tuple reception unit 11 receives a tuple which is to be the target of an aggregation process (step 101). The tuple received first by the tuple reception unit 11 is a tuple input from the data transmission unit 2, but as will be described with reference to step 109 below, the tuple reception unit 11 may alternatively receive a tuple stored in the output tuple storage unit 17. Here, for example, the tuple reception unit 11 is assumed to have received a tuple T1.

Next, the tuple reception unit 11 notifies the transaction management unit 12 of reception of the tuple T1, and also, transmits the tuple T1 to the tuple function execution unit 15. Then, the transaction management unit 12 determines whether or not the transaction is already started (step 102). In the case the transaction is already started (Yes in step 102), the tuple function execution unit 15 determines whether or not there is a defined tuple function for the tuple T1 (step 103). On the other hand, in the case the transaction is not yet started (No in step 102), the transaction management unit 12 starts the transaction (step 104), and proceeds to step 103.

Next, in the case it is determined in step 103 that there is no defined tuple function for the tuple T1 (No in step 103), the operator invoking unit 161 determines, based on the tuple name of the tuple T1 and the operator definition information stored in the definition information management unit 13, whether or not there is an operator that is not yet executed among operators that take the tuple T1 as the input tuple (step 105). On the other hand, in the case it is determined that there is a defined tuple function for the tuple T1 (Yes in step 103), the tuple function execution unit 15 executes the tuple function and changes the value of the column of the tuple T1 (step 106), and then, proceeds to step 105.

Then, in the case it is determined in step 105 that there is no operator that is not yet executed among operators that take the tuple T1 as the input tuple (No in step 105), the tuple reception unit 11 determines whether or not the output tuple storage unit 17 is empty (step 107). If the output tuple storage unit 17 is empty (Yes in step 107), the transaction is committed by the transaction management unit 12 (step 108), and the processing results of all the aggregation processes are assumed to have been fixed and are reflected in the database (each table). When reflection in the database is performed, the present processing flow is ended. On the other hand, in the case the output tuple storage unit 17 is not empty (No in step 107), the tuple reception unit 11 acquires a tuple from the output tuple storage unit 17 (step 109), and proceeds to step 101.

Also, in the case it is determined in step 105 that there is an operator that is not yet executed among operators that take the tuple T1 as the input tuple (Yes in step 105), the operator invoking unit 161 selects an operator that is not yet executed, and acquires the operator definition information of the selected operator from the definition information management unit 13 (step 110). Then, the operator invoking unit 161 acquires from the table storage unit 14 an input record defined in the acquired operator definition information. Next, the operator invoking unit 161 executes the operator function with the value of the column of the tuple T1 and the input record as the arguments, and generates aggregated data. At the time of the execution of the operator function, the operator invoking unit 161 acquires, based on the input tuple/input table mapping information, a record corresponding to the column of the tuple T1 from the input table.

Then, the output record generation unit 162 acquires the table definition information of the output table defined by the operator definition information acquired in step 110, transforms the aggregated data generated by the execution of the operator function into an output record, and writes the output record obtained by the transformation to the output table (step 111). Furthermore, if an output tuple is defined in the operator definition information, the output tuple generation unit 163 sets the values of the tuple T1, the input record, and the output record, and generates an output tuple, according to the tuple definition information of the output tuple.

Next, the aggregation process determination unit 164 determines whether or not the aggregation processes in step 110 and step 111 have succeeded (step 112). In the case of failure of the aggregation processes (No in step 112), the transaction is aborted by the transaction management unit 12 (step 113), and the processing results of the aggregation processes already performed in the transaction are cancelled and the state returns to the original state before the execution of the transaction, and the present processing flow is ended.

On the other hand, in the case of success of the aggregation processes (Yes in step 112), the aggregation process determination unit 164 further determines whether or not an output tuple is generated by the output tuple generation unit 163 (step 114). In the case an output tuple is not generated (No in step 114), the process proceeds to step 105 to process an operator that is not yet executed among operators that take the tuple T1 as the input tuple. On the other hand, in the case an output tuple is generated (Yes in step 114), the aggregation process determination unit 164 stores the output tuple in the output tuple storage unit 17 (step 115), and then, proceeds to step 105 as in the case where a negative determination (No) is made in step 114.

Figure 9:
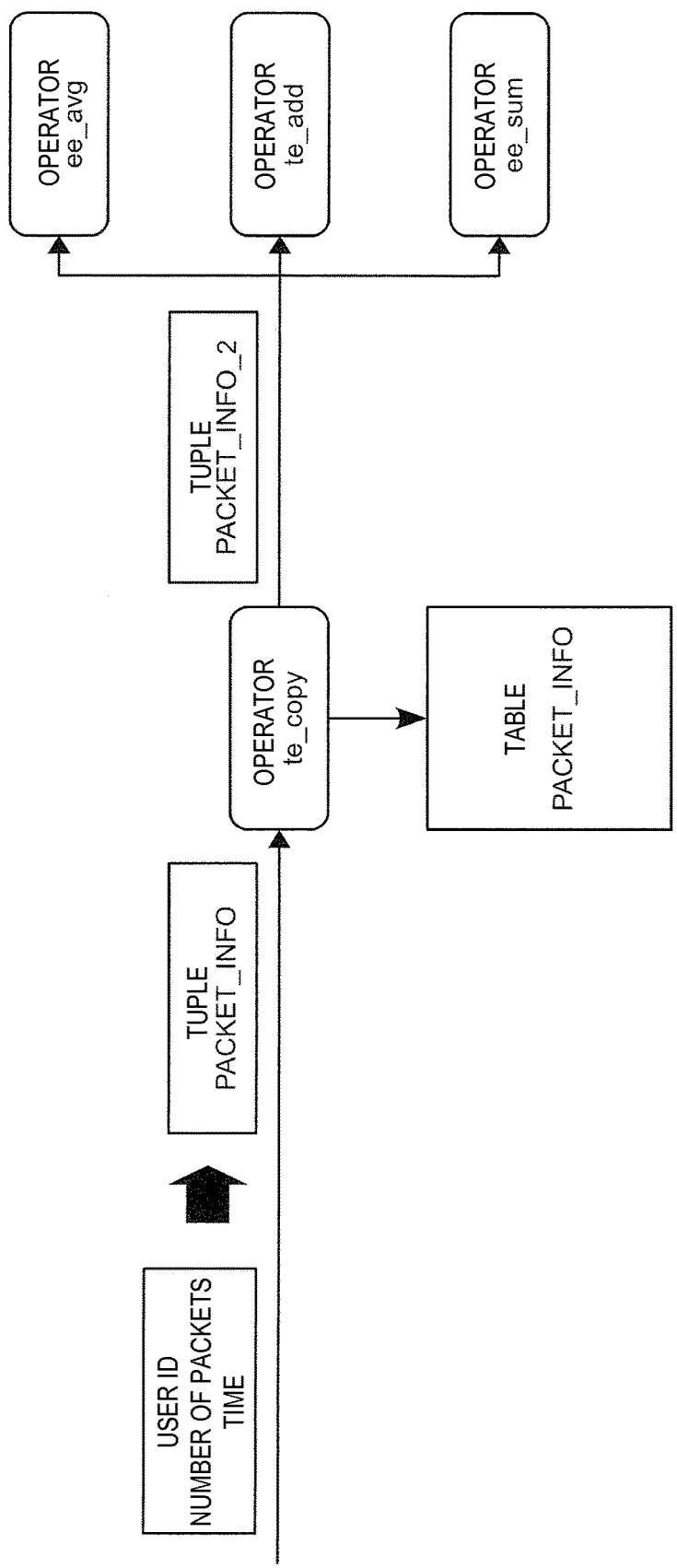
FIG. 9 is a diagram for describing a concrete example of an aggregation process by the data processing unit according to the embodiment.

Next, a concrete example of an aggregation process that is performed according to the aggregation processing procedure shown in FIG. 8 will be described. FIG. 9 is a diagram showing a concrete example of an aggregation process by the data processing unit 3 according to the embodiment. The aggregation process shown in FIG. 9 is an example of an aggregation process that is performed when the data transmission unit 2 receives data of the number of packets of a mobile phone, the data having the values of "user ID", "the number of packets", and "time", for example, transforms the data into a tuple format, and transmits the tuple obtained by the transformation to the data processing unit 3. The tuple transmitted to the data processing unit 3 is assumed to be the tuple "PACKET_INFO" shown in FIG. 5(a), and processes by four operators are assumed to be performed as a transaction. Also, the key value of the tuple "PACKET_INFO" is assumed to be the "user ID", which is the number used for identifying the user. The following steps correspond to the steps in FIG. 8.

First, when the tuple "PACKET_INFO" is input to the data processing unit 3, the tuple reception unit 11 receives the tuple "PACKET_INFO" (step 101). Since the transaction is not yet started at this time, the transaction management unit 12 starts the transaction (steps 102, 104). Next, the tuple function execution unit 15 executes the tuple functions "seqid( )" and "currenttime( )" defined in the tuple "PACKET_INFO", and changes the value of the column of the tuple (steps 103, 106).

Next, the operator invoking unit 161 acquires, from the definition information management unit 13, the definition information of the operator "te_copy" which takes the tuple "PACKET_INFO" as the input tuple (steps 105, 110). The definition information of the operator "te_copy" acquired at this time is the operator definition information shown in FIG. 7(a). Since no input table is defined in the operator definition information, the operator invoking unit 161 executes the operator function with the value of the column of the tuple "PACKET_INFO" as an argument, and generates aggregated data. Then, the output record generation unit 162 acquires the definition information of a table "PACKET_INFO", which is the output table defined in the operator definition information, transforms the aggregated data into an output record, and writes the output record obtained by the transformation to the output table "PACKET_INFO" (step 111). The definition information of the table "PACKET_INFO" acquired at this time is the table definition information shown in FIG. 6. Also, the output table includes the same key value (user ID) as the tuple "PACKET_INFO".

Furthermore, the output tuple generation unit 163 generates, as the output tuple, a tuple "PACKET_INFO_2" defined in the operator definition information. Here, the output tuple generation unit 163 generates, based on the values of the tuple "PACKET_INFO" and the output table "PACKET_INFO", the tuple "PACKET_INFO_2" shown in FIG. 5(b). The tuple "PACKET_INFO_2" includes the same key value (user ID) as the tuple "PACKET_INFO".

When the aggregation process has succeeded, since the output tuple "PACKET_INFO_2" is generated by the output tuple generation unit 163, the aggregation process determination unit 164 stores the output tuple "PACKET_INFO_2" in the output tuple storage unit 17 (steps 112 to 115). Next, the process proceeds to step 105, but since there is no operator that takes the tuple "PACKET_INFO" as the input tuple other than the operator "te_copy" (No in step 105), the tuple reception unit 11 acquires the tuple "PACKET_INFO_2" from the output tuple storage unit 17 (steps 107, 109), and subsequently, an aggregation process is performed on the tuple "PACKET_INFO_2".

Next, when the tuple reception unit 11 receives the tuple "PACKET_INFO_2" (step 101), since the transaction is already started (step 102) and there is no defined tuple function for the tuple "PACKET_INFO_2" (step 103), the operator invoking unit 161 determines whether or not there is an operator that is not yet executed among operators that takes the tuple "PACKET_INFO_2" as the input tuple (step 105). Here, there are three operators that define the tuple "PACKET_INFO_2" as the input tuple, i.e. "ee_avg", "te_add", and "ee_sum", and thus, the operator invoking unit 161 selects one of them, for example, the operator "ee_avg", and performs a process regarding the operator "ee_avg". In the process by the operator "ee_avg", the average value of the number of packets per minute is written to the output table.

When the aggregation process for the operator "ee_avg" ends in success (steps 110 to 115), the operator invoking unit 161 selects one of the operators that are not yet executed, "te_add" and "ee_sum", and sequentially performs the process. When the aggregation processes for the operators "te_add" and "ee_sum" also end in success, since there are no more operators that take the tuple "PACKET_INFO_2" and that are not yet executed (No in step 105), the tuple reception unit 11 determines whether or not the output tuple storage unit 17 is empty (step 107). If no output tuple is generated in the processes by the operators "ee_avg", "te_add", and "ee_sum", the output tuple storage unit 17 is empty, and the transaction is committed by the transaction management unit 12 (step 108). Then, data written to each table by the aggregation process by each operator is assumed to be fixed, and the series of aggregation processes is ended.

In this manner, for example, in the case where data of the number of packets of a mobile phone is to sequentially arrive at the aggregation processing system 1, the average value of the number of packets per minute or the like is written to the output table. Here, a plurality of pieces of data having the same key value (user ID) are processed in the order of arrival, but pieces of data with different user IDs are not always processed in the order of arrival. Also, the aggregation processing system 1 receives data from a large number of users, and thus, receives pieces of data with different user IDs in parallel, but does not receive two or more pieces of data from one user, that is, pieces of data with the same user ID, at the same time.

Next, a concrete example of a description regarding the definition information (the tuple definition information, the table definition information, the operator definition information) will be described. There are various methods as the description method of the definition information, but here, an example of a description in an XML (Extensible Markup Language) format will be described as an example. FIG. 10 is a diagram showing an example of a description of the definition information according to the embodiment.

First, the input table and the output table are defined by an <entity> tag. In the illustrated example, a table "DEVICE" and a table "DEVICE_INFO" are defined. Also, the column name and the column type of the tables are defined by <column> tags following the <entity>. In the case a table name is defined in the column type, the table has to be defined by another <entity> tag. Also, the column name of the key column is specified by a <primarykey> tag. A <relation> tag is used to relate the tables, and in the illustrated example, definition is performed so as to relate the "DEVICE_ID" column of the table "DEVICE" and the "DEVICE_ID" column of the table "DEVICE_INFO", from the table "DEVICE" to the table "DEVICE_INFO".

A tuple is defined by a <tuple> tag. The column name and the column type of the tuple are defined by the <column> tags following this <tuple>. In the illustrated example, <columns useentity="DEVICE_INFO"/> is defined. The "DEVICE_INFO" is the table name defined by the <entity> tag. By such a description, the same definition as the column definition of a table of the same name is used. A tuple function is defined with respect to the column of the tuple by a <tuplefunction> tag. In the illustrated example, "seqid (SEQID)" and "currenttime( )" are defined as the tuple functions.

An operator is defined by an <operator> tag. In the illustrated example, an operator that performs a process of receiving the tuple "DEVICE_INFO" and storing the value in the table "DEVICE_INFO" is defined. This storage process is performed by the operator "te_copy".

Also, in the illustrated example, the number of records in the table "DEVICE_INFO" monotonically increases with the reception of tuples. On the other hand, it is also possible to define a configuration where a limit value is set to the number of records, and when the number is exceeded, the oldest record is automatically deleted. This may prevent the number of records in the table "DEVICE_INFO" from monotonically increasing. For example, there is a method of defining <entity name="DEVICE_INFO"> by <entity name="DEVICE_INFO" writeonce="LAST_MODIFIED: 100">. This writeonce attribute sets the maximum number of records to 100 for each DEVICE_ID, and when this is exceeded, issues an instruction that deletion is to be performed from one with the oldest timestamp value in the LAST_MODIFIED column.

In this manner, the tuple definition information, the table definition information, and the operator definition information are defined, and processes by the operators are implemented.

As described above, the aggregation processing system 1 according to the embodiment instantly performs an aggregation process on each piece of data, with respect to a large number of pieces of data arriving from outside. In this aggregation process, the aggregation processing system 1 performs a process by combining each piece of arriving data with data that is already held and saves the result, instead of executing a preset action in the case data matches a certain condition or of collectively processing a plurality of pieces of data.

Specifically, the aggregation processing system 1 treats a plurality of tuples having the same key value as a series of data, refers to a data group (input table) related to the key value of the tuples, and performs a process by the operator based on the tuple and the input table, and performs writing to the output table or generation of an output tuple. Moreover, since the aggregation processing system 1 performs a plurality of aggregation processes as a transaction, update of a plurality of output tables for one piece of data is performed in a consistent manner.

The embodiment proposes a basic model of an operator for implementing an aggregation process, and also, a mechanism for combining and executing operators implemented based on the model. Thus, a system for performing an aggregation process may be easily implemented, and also, by providing an operator for performing basic operations in advance, for example, the costs of program development by system developers are reduced. Also, by implementing the aggregation processing system 1 using highly extensible (scalable) data grid technology where data is held in a memory, an extensible system for performing an aggregation process at a high speed is easily implemented.

Also, in the embodiment, processes by operators performed for a tuple that is input from the data transmission unit 2 is treated as one transaction, but this configuration is not restrictive. For example, processes by operators may be performed as two or more transactions.

Moreover, in the embodiment, a transaction is committed where there is no longer a tuple stored in the output tuple storage unit 17, but this configuration is not restrictive. For example, at what point a transaction is to be committed may be set in advance by a description of a program or the like.

Figure 11:
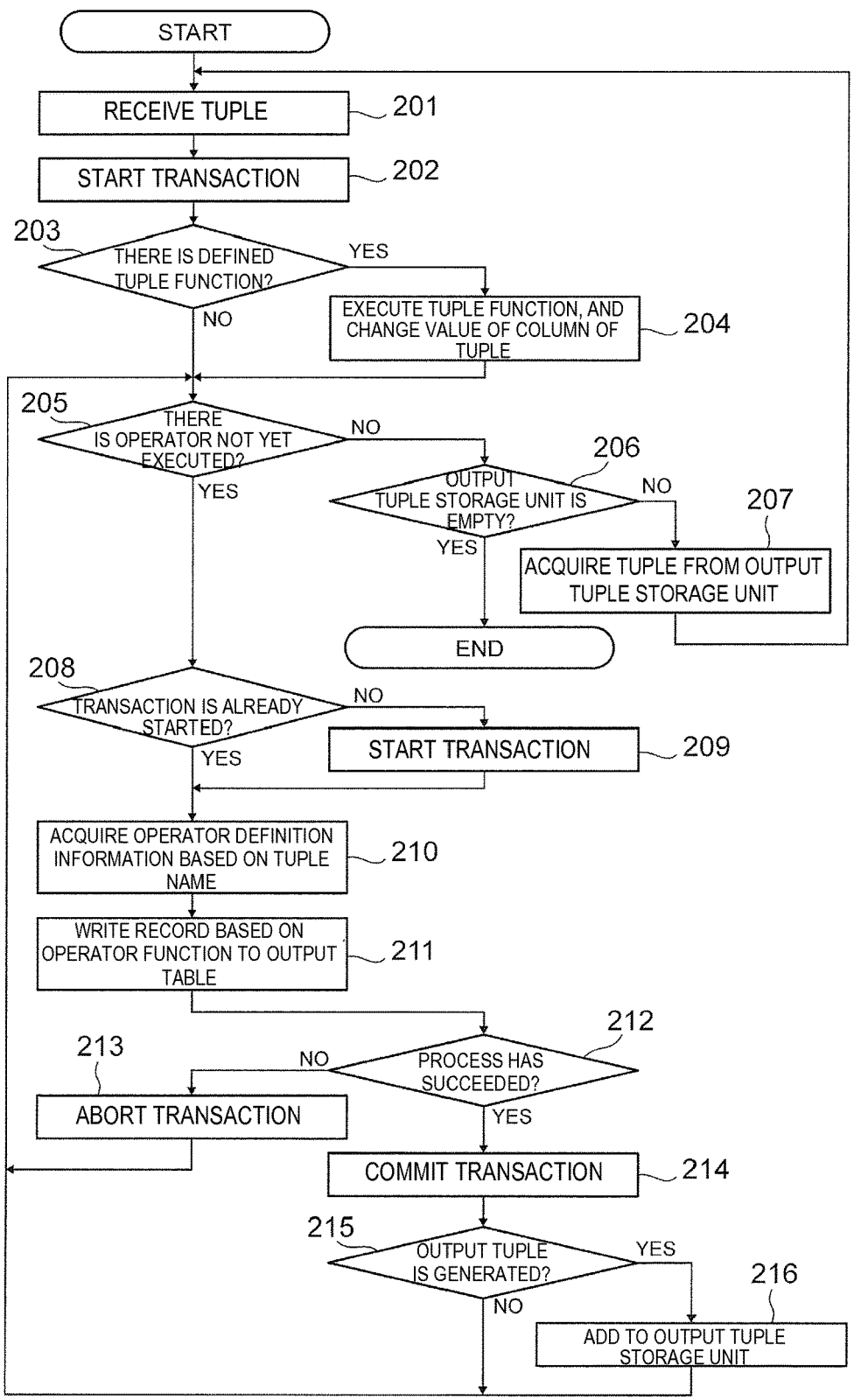
FIG. 11 is a flow chart showing another example of the aggregation processing procedure by the data processing unit according to the embodiment.

Next, another example of the procedure of the aggregation process will be described. FIG. 11 is a flow chart showing another example of the aggregation processing procedure by the data processing unit 3 according to the embodiment. In the procedure of an aggregation process shown in FIG. 8, a case where the processes by the operators performed on a tuple input from the data transmission unit 2 are treated as one transaction has been described. On the other hand, in the procedure of an aggregation process shown in FIG. 11, it is specified in advance that a transaction is to be completed for the process by each operator.

First, the tuple reception unit 11 receives a tuple which is to be the target of an aggregation process (step 201). Here, for example, a tuple T2 is assumed to have been received by the tuple reception unit 11. Then, the tuple reception unit 11 notifies the transaction management unit 12 of reception of the tuple T2, and also, transmits the tuple T2 to the tuple function execution unit 15. Then, the transaction management unit 12 starts a transaction (step 202).

Next, the tuple function execution unit 15 determines whether or not there is a defined tuple function for the tuple T2 (step 203). In the case it is determined that there is no defined tuple function for the tuple T2 (No in step 203), the operator invoking unit 161 determines, as in step 105, based on the tuple name of the tuple T2 and the operator definition information stored in the definition information management unit 13, whether or not there is an operator that is not yet executed among operators that take the tuple T2 as the input tuple (step 205). On the other hand, in the case it is determined that there is a defined tuple function for the tuple T2 (Yes in step 203), the tuple function execution unit 15 executes the tuple function and changes the value of the column of the tuple T2 (step 204), as in step 106.

Then, in the case it is determined in step 205 that there is no operator that is not yet executed among operators that take the tuple T2 as the input tuple (No in step 205), the tuple reception unit 11 determines whether or not the output tuple storage unit 17 is empty (step 206), as in step 107. If the output tuple storage unit 17 is empty (Yes in step 206), the present processing flow is ended. At this time, if the transaction which has been started is not committed, it is committed. On the other hand, in the case the output tuple storage unit 17 is not empty (No in step 206), the tuple reception unit 11 acquires a tuple from the output tuple storage unit 17 (step 207), as in step 109, and proceeds to step 201.

Also, in the case it is determined in step 205 that there is an operator that is not yet executed among operators that take the tuple T2 as the input tuple (Yes in step 205), the operator invoking unit 161 selects an operator that is not yet executed, and determines whether or not a transaction is started by the transaction management unit 12 (step 208). In the case a transaction is not started (No in step 208), the transaction management unit 12 starts a transaction (step 209). On the other hand, in the case a transaction is started (Yes in step 208), the operator invoking unit 161 acquires the operator definition information of the selected operator from the definition information management unit 13 (step 210).

Then, as in step 111, the operator invoking unit 161 performs execution of the operator function and writing of the output record (step 211). Furthermore, if an output tuple is defined in the operator definition information, the output tuple generation unit 163 generates an output tuple according to the tuple definition information of the output tuple. Next, as in step 112, the aggregation process determination unit 164 determines whether or not the aggregation process has succeeded (step 212). In the case of failure of the process (No in step 212), the transaction is aborted (step 213), the processing result of the aggregation process by the selected operator is cancelled and the state returns to the original state, and the process proceeds to step 205.

On the other hand, in the case the aggregation process has succeeded (Yes in step 212), the transaction is committed by the transaction management unit 12 (step 214), and the processing result of the aggregation process by the selected operator is reflected in the database (each table), being assumed to have been fixed. Next, as in step 114, the aggregation process determination unit 164 determines whether or not an output tuple is generated by the output tuple generation unit 163 (step 215). In the case an output tuple is not generated (No in step 215), the process proceeds to step 205. On the other hand, in the case an output tuple is generated (Yes in step 215), the aggregation process determination unit 164 stores the output tuple in the output tuple storage unit 17 (step 216), as in step 115, and proceeds to step 205.

As described above, according to the aggregation processing procedure shown in FIG. 11, the transaction is started and completed for each process by an operator. With the transaction being started and completed for each process by an operator, aggregation processes are sequentially performed on one piece of data as the processing by the data processing unit 3, and at the same time, for example, even if one aggregation process failed, other aggregation processes are sequentially performed. However, to prevent occurrence of an inconsistency in the database, the tuple reception unit 11 does not receive, from the data transmission unit 2, a tuple having the same key value as a tuple which was transmitted from the data transmission unit 2, until there is no more output tuple stored in the output storage unit 17 with respect to the tuple.

Figures 1, 12:
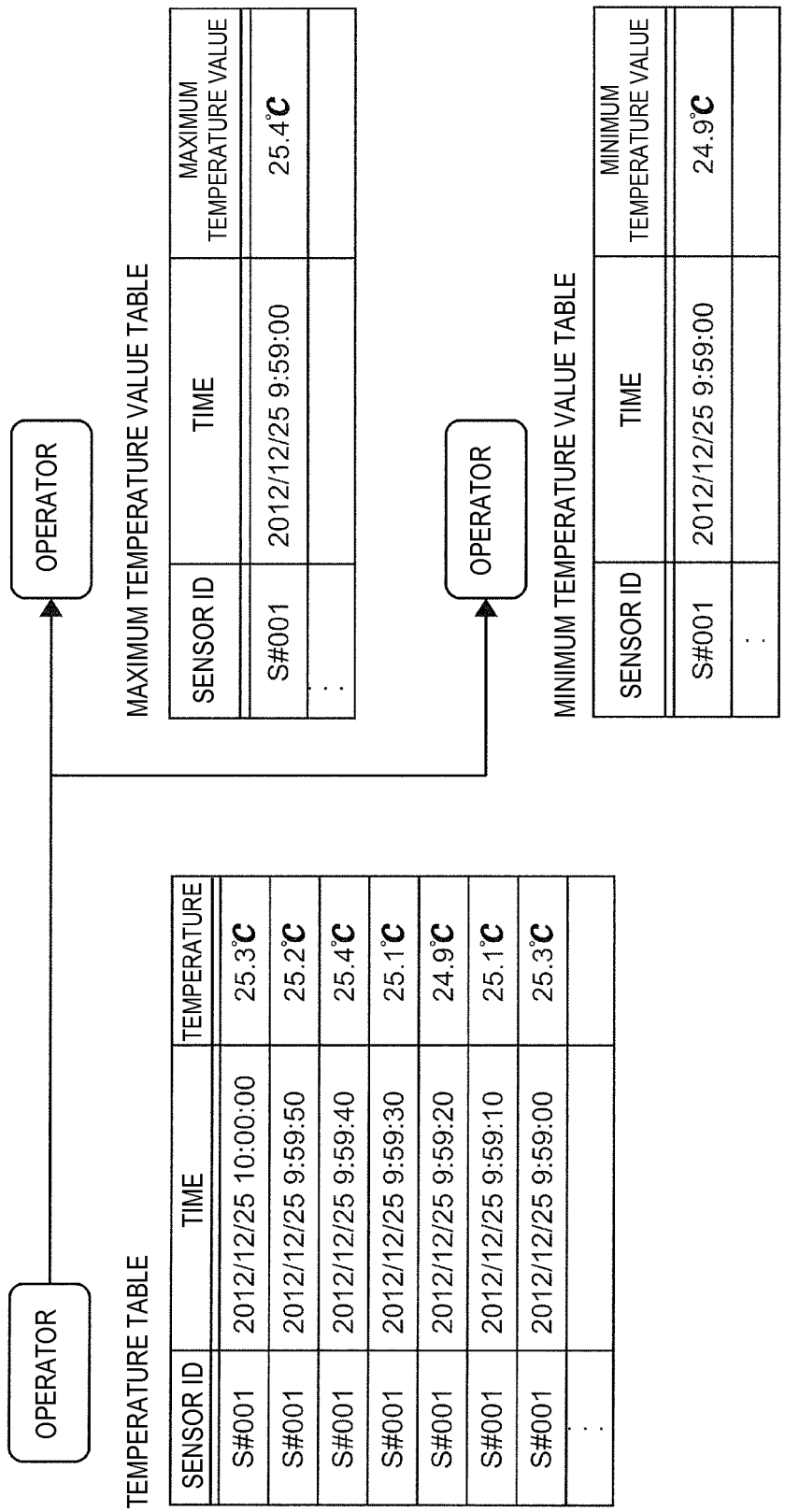
Figures 2, 12:
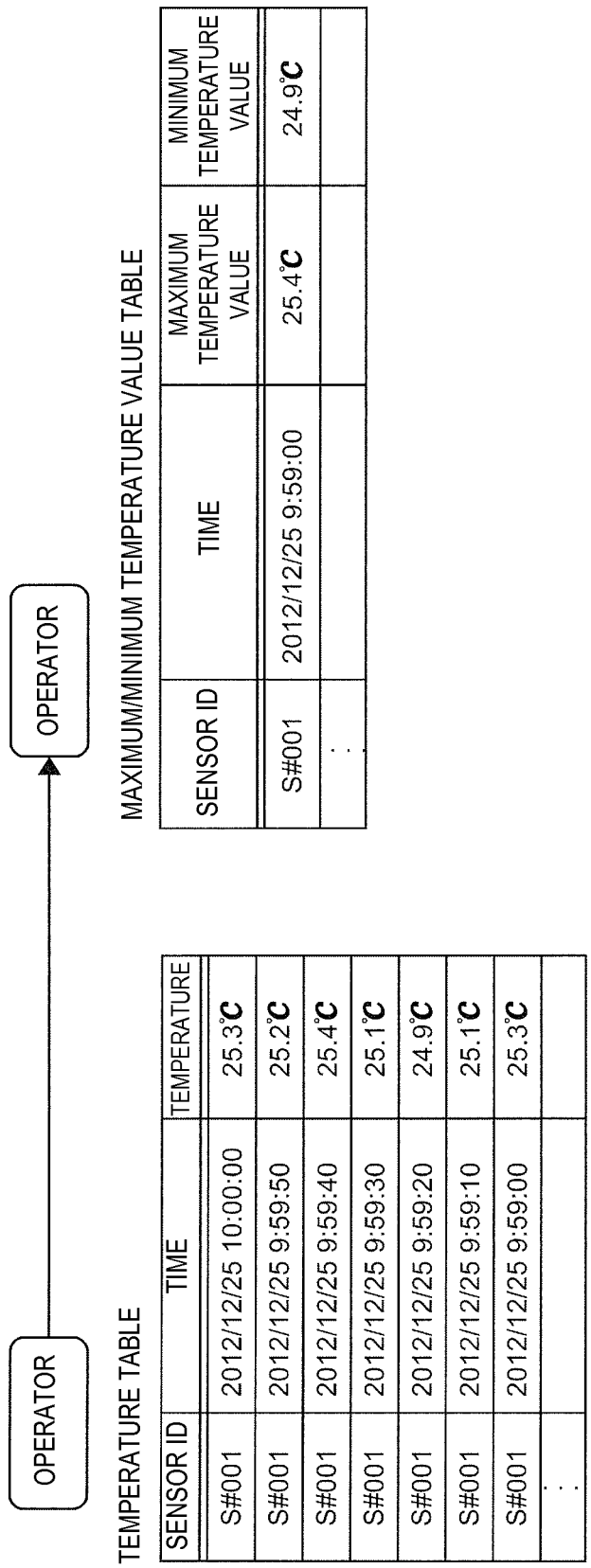

Next, an optimization process for optimizing an aggregation process and increasing the performance will be described. FIG. 12 (FIGS. 12-1 and 12-2) are diagrams for describing a first example of an optimization process according to the embodiment. FIG. 12-1 is a diagram showing an example of an aggregation process result before optimization, and FIG. 12-2 is a diagram showing an example of the aggregation process result after optimization.

The aggregation process result of FIG. 12-1 is a result of an aggregation process of recording, with respect to temperature information transmitted from external sensors every 10 seconds, the maximum value and the minimum value of the temperature for each minute for each sensor. For example, when a tuple with a time 2012 Dec. 25 10:00:00 arrives, two operators refer to the input records for 2012 Dec. 25 9:59 (six records from 9:59:00 to 9:59:50) in the input table (temperature table), and each acquire the maximum value or the minimum value, and record the value in the output table of the operator (the minimum temperature value table, the maximum temperature value table). The key values of the input table and the output table are the sensor ID and time. Before optimization, the output table is defined separately for the maximum temperature value table and for the minimum temperature value table. Thus, two records are written to respective output tables.

However, these two operators refer to the same record group with respect to an input record. Thus, if the two operators are put together, calculation of the maximum value and the minimum value is performed by one read process for the input record. Moreover, with respect to the output record, the two operators write records having the same key value to respective tables. Thus, if the output tables are made one table, the operators write the maximum value and the minimum value by writing of one record. FIG. 12-2 is a diagram showing a result of performing such an optimization process, and two operators are grouped to perform the optimization process.

There are three conditions for performing such grouping of operators, which are, with respect to two or more operators to be grouped: the input tables are the same and the same record group is to be read; records having the same key value are to be inserted into the output tables or are to be updated; and the same tuple is to be read. The operator invoking unit 161 determines whether or not the three conditions are satisfied for certain two or more operators, and if all the conditions are satisfied, the optimization process is performed by performing grouping of these operators.

Moreover, the determination regarding certain two or more operators of whether or not the input tables are the same and the same record group is to be read is performed based on pieces of information about the input table name of the operator definition information, the content of processes by the operators, and parameters used in the processes by the operators. Also, the determination regarding certain two or more operators of whether or not records of the same key value are to be inserted into the output tables or are to be updated is dependent on the content of the processes by the operators. Furthermore, the determination regarding certain two or more operators of whether or not the same tuple is to be read is performed based on the operator definition information.

Figure 13:
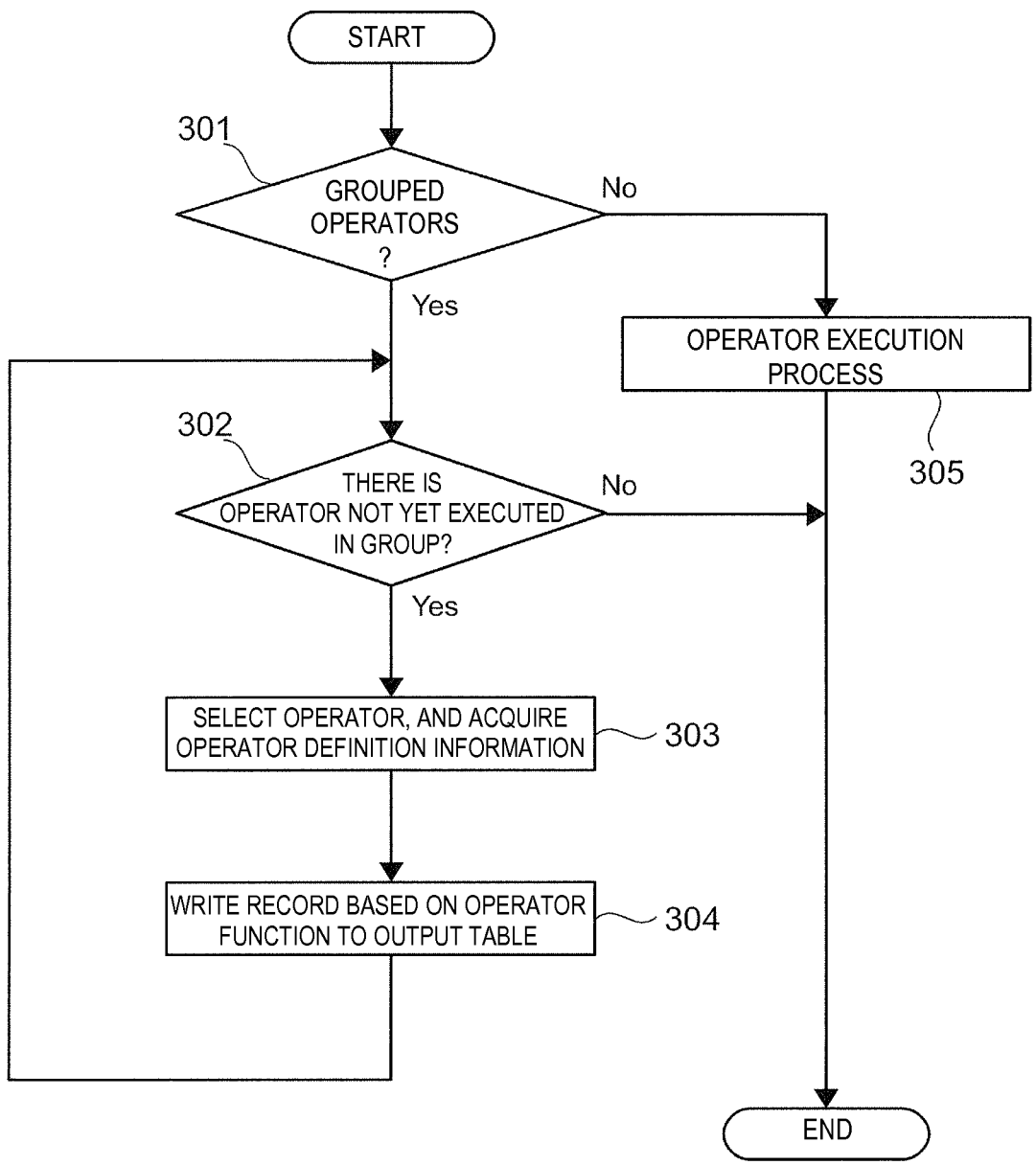
FIG. 13 is a flow chart showing an example of a procedure of execution of grouped operators according to the embodiment.

To execute operators which have been grouped (hereinafter, referred to as grouped operators), the procedure of invoking the operators has to be extended, but it is enough if the processes of steps 110 and 111 of FIG. 8 are changed, for example. FIG. 13 is a flow chart showing an example of a procedure of execution of grouped operators according to the embodiment. The present procedure is performed after a positive determination (Yes) is made in step 105 in the procedure shown in FIG. 8.

First, the operator invoking unit 161 determines whether or not the operators are grouped operators (step 301). In the case of the grouped operators (Yes in step 301), the operator invoking unit 161 determines whether or not there is an operator that is not yet executed in the group (step 302). In the case there is an operator that is not yet executed (Yes in step 302), the operator invoking unit 161 selects an operator that is not yet executed, and acquires the operator definition information of the selected operator from the definition information management unit 13 (step 303). Then, the operator invoking unit 161 performs execution of the operator function and writing of the output record (step 304). Moreover, if an output tuple is defined in the operator definition information, the output tuple generation unit 163 generates an output tuple according to the tuple definition information of the output tuple. Then, the process proceeds to step 302.

Also, in the case the operator invoking unit 161 determines in step 302 that there is no operator that is not yet executed in the group (No in step 302), the present processing flow is ended. Also, in the case grouped operators are not determined in step 301 by the operator invoking unit 161 (No in step 301), the operator execution processes (step 305) of steps 110 and 111 of FIG. 8 are performed, and the present processing flow is ended. After the present processing flow is ended, the process proceeds to step 112 of FIG. 8. Also, the output tuples generated by the grouped operators are collectively stored in step 115 of FIG. 8 in the output tuple storage unit 17.

With the aggregation processing system 1 performing such an optimization process, the read process from an input table is reduced, the number of records to be written to the output table is reduced, and the performance of the aggregation process is increased.

Figure 14:
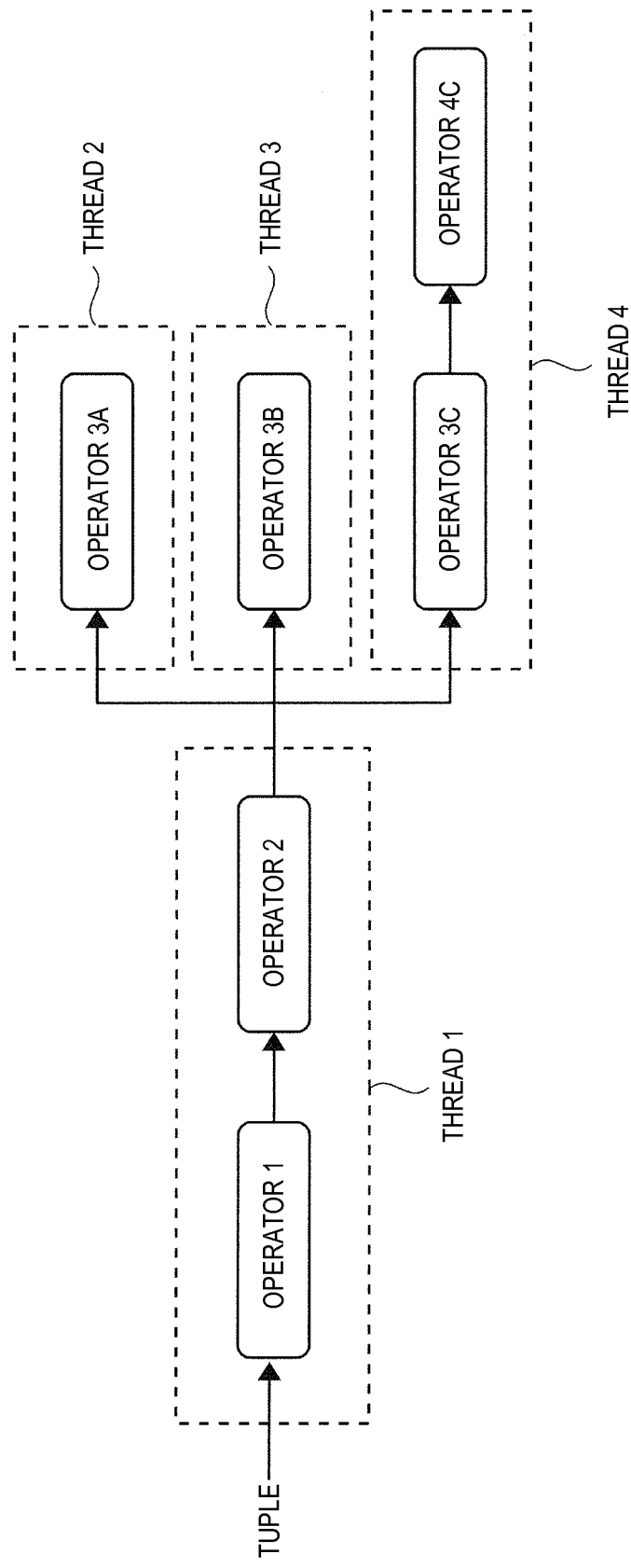
FIG. 14 is a diagram for describing a second example of the optimization process according to the embodiment.

Next, another example of the optimization process will be described. FIG. 14 is a diagram for describing a second example of the optimization process according to the embodiment. The process that is performed in the present example is a parallelization process. A parallelization process is a process of simultaneously performing processes by separate threads in parallel in a plurality of operator processes for one tuple arriving from outside. A thread is a unit of processing by a CPU (Central Processing Unit) which is arithmetic processing means.

According to the configuration shown in FIG. 14, first, processes by an operator 1 and an operator 2 are performed by a thread 1. Then, the tuple generated by the operator 2 is transferred to operators 3A to 3C, and these operators are executed in parallel by separate threads. The operator 3A is executed by a thread 2, the operator 3B is executed by a thread 3, and the operator 3C and the following operator 4C are executed by a thread 4. If the processes by these operators are one transaction, the thread 1 waits for the end of the threads 2, 3, and 4, and then, the transaction is committed.

The condition for performing such a parallelization process of the operators is that the same tuple is defined as the input tuple, and whether or not parallelization is possible is determined by the operator invoking unit 161 based on the operator definition information of each operator. Also, as the method of performing the parallelization process, there are two methods, i.e. a method where setting is performed in advance such that the parallelization process is performed if parallelization is possible, and a method of determining whether or not parallelization is to be performed by taking into account the state of the CPU or the memory resources at the time of execution.

Figure 15:
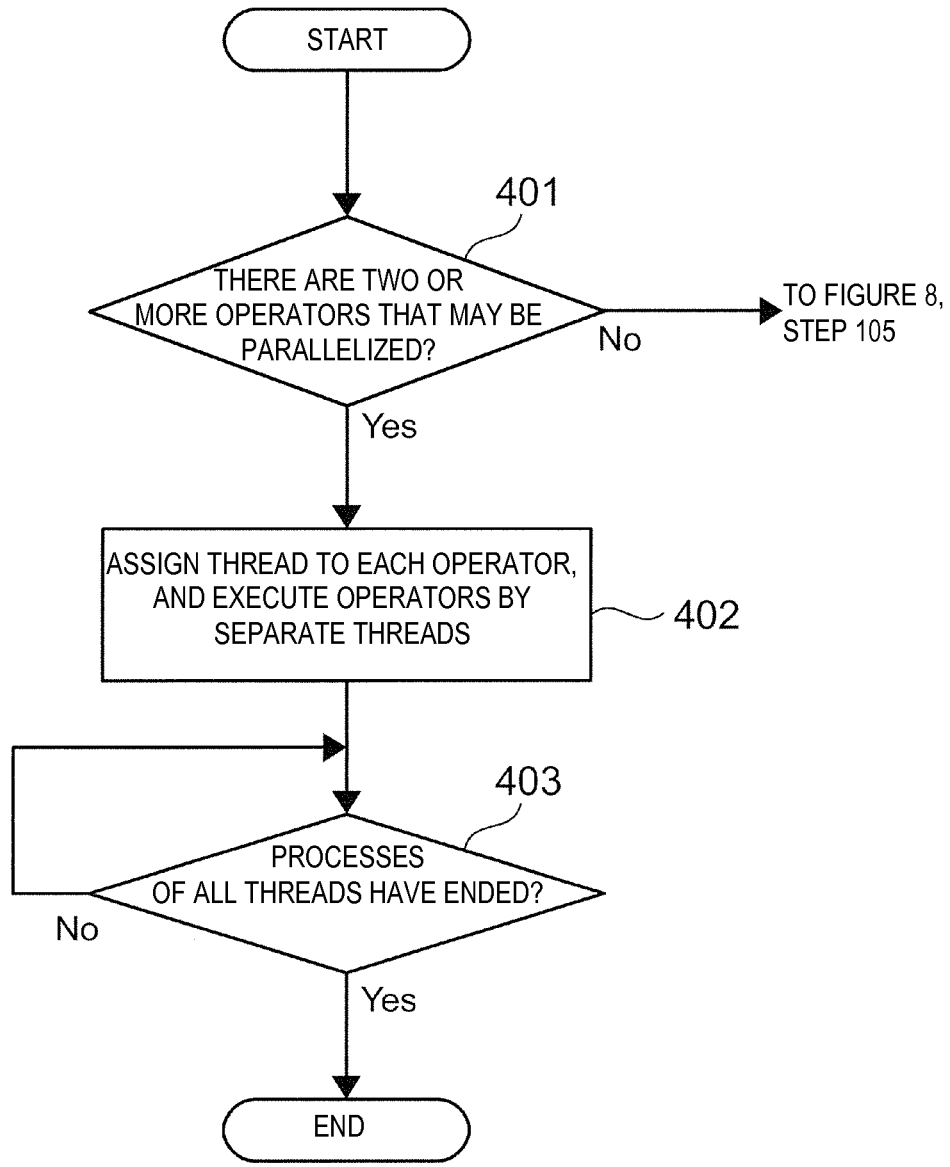
FIG. 15 is a flow chart showing an example of a procedure of a parallelization process according to the embodiment.

FIG. 15 is a flow chart showing an example of a procedure of the parallelization process according to the embodiment. The present procedure is performed, in the procedure shown in FIG. 8, after a negative determination (No) is made in step 103, or after step 106.

First, the operator invoking unit 161 determines whether or not there are two or more operators that may be parallelized (step 401). In the case two or more operators that may be parallelized are not present (No in step 401), the process proceeds to step 105 of FIG. 8. On the other hand, in the case there are two or more operators that may be parallelized (Yes in step 401), the operator invoking unit 161 assigns a thread to each operator that may be parallelized, and executes the operator by each thread (step 402). In step 402, the processes of steps 110 to 115 are performed by each operator. Then, the operator invoking unit 161 determines whether or not the processes by all the threads have ended (step 403). If the processes by all the threads are ended (Yes in step 403), the present processing flow is ended. After the present processing flow is ended, the process proceeds to step 105 of FIG. 8.

With the aggregation processing system 1 performing such a parallelization process, the processing time of a series of aggregation processes related to one tuple is reduced, and the performance of the aggregation processing is increased. However, in a state where the CPU resources are being used to the full, if processes for one tuple are parallelized, the performance may be reduced due to the overhead. For example, in a state where tuples related to a specific key value successively arrive, but only a few tuples of other key values arrive, and there are surplus CPU resources, the processing time is reduced by the parallelization process.

The aggregation processing system 1 according to the embodiment described above may be used, not only as an independent system, but also in combination with other similar aggregation processing systems 1, or by being embedded in another system. For example, in the case of aggregating information of sensors distributed all over Japan, a system is conceivable according to which the aggregation processing system 1 according to the embodiment is installed in each district and temporal aggregation is performed by the system, and aggregation of information about the whole country is performed by another aggregation processing system 1 for putting together the aggregation results of the temporal aggregation.

Figure 16:
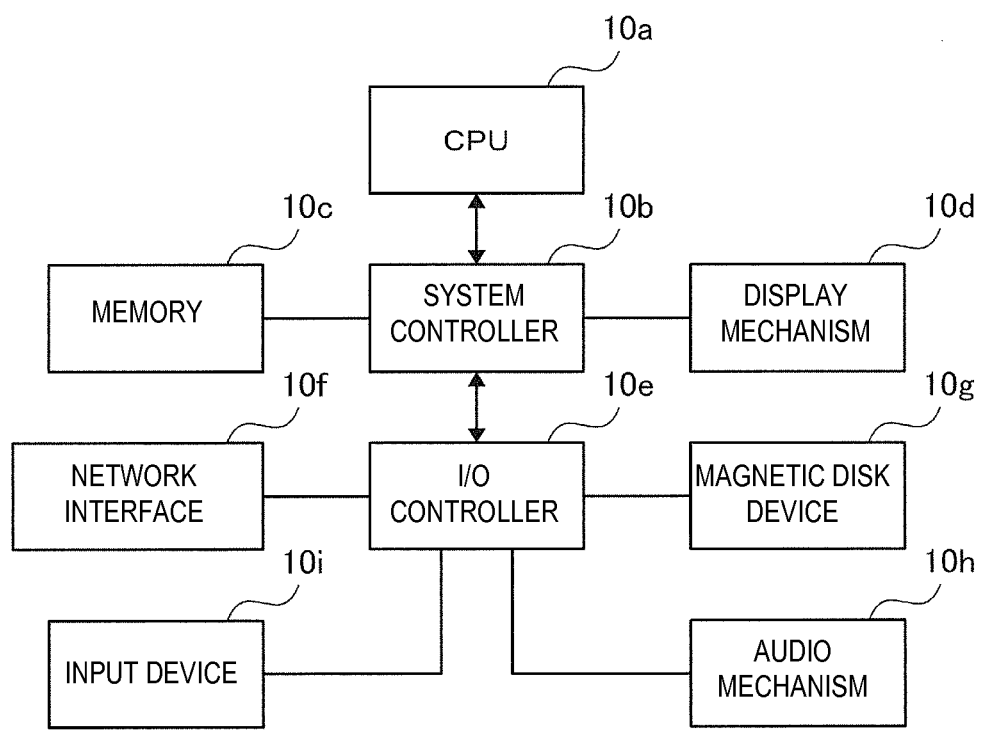
FIG. 16 is a diagram showing an example hardware configuration suitable for configuring the data processing unit according to the embodiment.

FIG. 16 is a diagram showing an example hardware configuration suitable for configuring the data processing unit 3 according to the embodiment. Here, application to a computer will be described. The computer shown in FIG. 16 includes a CPU 10a, which is arithmetic processing means, and a memory 10c, which is main storage means. Also, as external devices, a magnetic disk device (HDD: Hard Disk Drive) 10g, a network interface 10f, a display mechanism 10d including a display device, an audio mechanism 10h, an input device 10i such as a keyboard or a mouse, and the like are provided.

In the example configuration shown in FIG. 16, the memory 10c and the display mechanism 10d are connected to the CPU 10a via a system controller 10b. Also, the network interface 10f, the magnetic disk device 10g, the audio mechanism 10*h*, and the input device 10*i* are connected to the system controller 10*b* via an I/O controller 10*e*. The structural elements are connected by various buses such as a system bus, an input/output bus, and the like.

Additionally, FIG. 16 merely shows an example of the hardware configuration of a computer suitable for application of the embodiment. The embodiment may be widely applied to devices capable of processing each piece of arriving data in combination with data that is already held, and saving the result, and the configuration shown in the drawing is not the only one to implement the embodiment.

In FIG. 16, the magnetic disk device 10*g* stores OS and application programs. Then, each function of the tuple reception unit 11, the transaction management unit 12, the tuple function execution unit 15, and the aggregation process execution unit 16 according to the embodiment is implemented by these programs being read into the memory 10*c* and executed by the CPU 10*a*. Also, the definition information management unit 13, the table storage unit 14, and the output tuple storage unit 17 are implemented by storage means such as the memory 10*c*, the magnetic disk device 10*g*, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

REFERENCE SIGNS LIST

1 . . . Aggregation processing system
2 . . . Data transmission unit
3 . . . Data processing unit
11 . . . Tuple reception unit
12 . . . Transaction management unit
13 . . . Definition information management unit
14 . . . Table storage unit
15 . . . Tuple function execution unit
16 . . . Aggregation process execution unit
161 . . . Operator invoking unit
162 . . . Output record generation unit
163 . . . Output tuple generation unit
164 . . . Aggregation process determination unit
17 . . . Output tuple storage unit
201 . . . Tuple transmission unit
301 . . . RDA server process
302 . . . RDB server process

What is claimed is:

1. A method for receiving data implemented by a computing processor, comprising:
    receiving the data as pieces of data arriving one after another, wherein each piece of data from the pieces of data has a key value;
    classifying each piece of data according to the key value of the each piece of data; processing pieces of data having identical key values in order of arrival, wherein the processing includes one or more aggregation processes, the one or more aggregation processes comprising:
    receiving a piece of data from the each piece of data as an input data having a key value of the input data;
    invoking, by a processing unit, at least one operator that is for performing an aggregation process for the input data;
    performing a predetermined process on the input data by the at least one operator; outputting at least one of a first output data and a second output data by the at least one operator, the first output data having the key of the input data, and the second output data having the key of the input data and to be stored in a database in a storage unit, wherein, when receiving the piece of the input data, when the first output data is stored in the storage unit, the first output data is received as the input data by a reception unit, and wherein, when there is no first output data stored in the storage unit, the reception unit receives the piece of input data as the input data;
    determining if the aggregation process has been interrupted due to an occurrence of a fault;
    in response to the determining if the aggregation process has been interrupted:
    cancelling a result of the aggregation process; returning the database to its state before the performing the aggregation process;
    determining if the aggregation process has ended normally; and in response to the determining that the aggregation process has ended normally, storing a next piece of data in the database stored in the storage unit, the next piece of data having the key of the input data and generated in the process by the at least one operator; and
    performing, by at least one additional operator, a subsequent aggregation process on each subsequent input data from the each piece of data without performing a collective aggregation process after accumulating the each piece of data.

2. The method of claim 1, further comprising:
    receiving, in addition to the piece of data, a third data read from the database; and performing the process on the piece of data based on the input data and the third data.

3. The method of claim 1, comprising:
    wherein the receiving of the input data having the key value of the input data comprises:
    receiving specific data having the key value of the input data as the input data by a plurality of processing units;
    wherein the performing of the process on the input data comprises:
    performing the predetermined process on the input data by the plurality of processing units; and
    outputting at least one of the first output data and the second output data based on a processing result, the first output data having the key, the second output data having the key and to be stored in the database, wherein a first processing unit of the plurality of processing units takes the received data as the input data, and a second processing unit of the plurality of processing units receives the first output data from the first processing unit as the input data.

4. The method of claim 3, wherein the first processing unit receives, in addition to the input data, a second input data read from the database, and performs the predetermined process based on the input data and the second input data.

5. The method of claim 3, wherein when no first output data is output from the plurality of processing units, or when the second processing unit is not present, the aggregation process for the input data having the key value of the input data is ended.

6. The method of claim 1, wherein the content of the database is fixed each time the process of the operator by the processing unit is ended.

7. A system for receiving data keys that are values used for classification from outside and performing an aggregation process, the system comprising:
    a processor; and a computer readable medium having program instructions embodied therewith, the program instructions executable by the processor to implement the aggregation process;
    a reception unit for receiving pieces of data, each piece of data having a key value, as target of the aggregation process, and for classifying the each piece of data according to the key value of the each piece of data;
    a first storage unit for storing a database; a processing unit for invoking at least one operator that is for processing the each piece of data when the each piece of data is received as an input data having a key value of the input data by the reception unit, wherein pieces of data having identical key values are processed in order of arrival, wherein the processing includes one or more aggregation processes, each aggregation process comprising:

performing a predetermined process on the input data by the at least one operator, outputting at least one of a first output data and a second output data, the first output data having the key value of the input data, and the second output data having the key value of the input data and to be stored in the database held by the first storage unit;

determining if the aggregation process has been interrupted due to an occurrence of a fault; and in response to the determining if the aggregation process has been interrupted, cancelling a result of the aggregation process, returning the database to its state before the performing the aggregation process;

and determining if the aggregation process has ended normally; and a second storage unit for, in response to the determining that the aggregation process has ended normally, storing a next piece of data in the database held by the first storage unit, the next piece of data having the key of the input data and generated in a process performed on the input data by the at least one operator, and further for storing the first output data output by the processing unit, wherein, when receiving the input each piece of data, when the first output data is stored in the second storage unit, the reception unit receives the first output data as the input data, and when there is no first output data stored in the second storage unit, the reception unit receives the input each piece of data as the input data, and the content of the database where the second output data is stored is fixed.

8. The system of claim 7, wherein the at least one operator that is invoked by the processing unit receives, in addition to the input data, third input data that is read from the database, and performs the process on the input data based on the input data and the third input data.

9. The system of claim 7, further comprising:

a plurality of processing units for receiving specific data having the key value of the input data as the input data, performing the predetermined process on the input data, and outputting at least one of the first output data and the second output data based on a processing result, the first output data having the key, the second output data having the key and to be stored in the database that is held by the first storage unit, wherein, of the plurality of processing units, a first processing unit that takes the received data as the input data is the first processing unit, and a second processing unit that receives the first output data output by the first processing unit as the input data follows the first processing unit.

10. The system of claim 9, wherein the processing unit receives, in addition to the input data, a second input data read from the database, and performs the predetermined process based on the input data and the second input data.

11. The system of claim 9, wherein, when no first output data is output from the plurality of processing units, or when the second processing unit is not present, the aggregation process for pieces of data having the key value of the input data is ended.

12. The system of claim 7, wherein the content of the database is fixed every time the process of the at least one operator by the processing unit is ended.

13. A computer program product for performing an aggregation process for each piece of received data, the computer program product comprising a computer readable storage medium having program instructions embodied therewith, wherein the computer readable storage medium is not a transitory signal per se, the program instructions executable by a processor to cause the processor to perform a method comprising:

receiving the data as pieces of data arriving one after another, wherein each piece of data from the pieces of data has a key value;

classifying each piece of data according to the key value of the each piece of data; processing pieces of data having identical key values in order of arrival, wherein the processing includes one or more aggregation processes, the one or more aggregation processes comprising:

receiving a piece of data from the each piece of data as an input data having a key value of the input data;

invoking, by a processing unit, at least one operator that is for performing an aggregation process for the input data;

performing a predetermined process on the input data by the at least one operator; outputting at least one of a first output data and a second output data by the at least one operator, the first output data having the key value of the input data, and the second output data having the key value of the input data and to be stored in a database in a storage unit, wherein, when receiving the input piece of data, when the first output data is stored in the storage unit, a the reception unit receives the first output data as the input data, and the content of the database where the second output data is stored is fixed;

determining if the aggregation process has been interrupted due to an occurrence of a fault and, in response to the determining that the aggregation process has been interrupted:

cancelling a result of the aggregation process; and returning the database to its state before the performing the aggregation process;

determining if the aggregation process has ended normally; and in response to the determining that the aggregation process has ended normally:

storing a next piece of data in the database, the next piece of data having the key of the input data, and having been generated in the process by the at least one operator;

receiving each subsequent piece of data from the each piece of received data; and performing, by at least one additional operator, a subsequent aggregation process on the each subsequent piece of data without performing a collective aggregation process after accumulating the each piece of data.

\* \* \* \* \*